(12) United States Patent
Samalot et al.

(10) Patent No.: US 11,840,025 B2
(45) Date of Patent: Dec. 12, 2023

(54) THERMOPLASTIC COMPOSITE INDUCTION WELDING TOOLING FOR RIBS

(71) Applicant: The Boeing Company, Chicago, IL (US)

(72) Inventors: Francis J. Samalot, St. Louis, MO (US); Michael P. Matlack, St. Charles, MO (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 17/491,447

(22) Filed: Sep. 30, 2021

(65) Prior Publication Data

US 2023/0095229 A1    Mar. 30, 2023

(51) Int. Cl.
  *B29C 65/78*    (2006.01)
  *B29C 65/32*    (2006.01)
  *B29C 65/00*    (2006.01)

(52) U.S. Cl.
  CPC .......... *B29C 65/7802* (2013.01); *B29C 65/32* (2013.01); *B29C 65/7841* (2013.01); *B29C 66/71* (2013.01); *B29C 66/8242* (2013.01)

(58) Field of Classification Search
  CPC ..... B29C 65/32; B29C 65/36; B29C 65/3668; B29C 65/7802; B29C 65/7841; B29C 66/71; B29C 66/8242; B29C 66/8169; B29C 66/863; B29C 66/73921; B64F 5/10

See application file for complete search history.

(56) References Cited

U.S. PATENT DOCUMENTS

2007/0157455 A1* 7/2007 Kownacki ........... B29C 66/9192
                                                                29/557
2016/0375629 A1   12/2016 Matsen et al.

FOREIGN PATENT DOCUMENTS

DE    102009022556 A1 *  6/2010  ........... B29C 65/203
EP        3772406 A1      2/2021

OTHER PUBLICATIONS

"Extended European Search Report Issued in European Patent Application No. 22187794.7", dated Feb. 2, 2023, 8 Pages.

* cited by examiner

Primary Examiner — John L Goff, II
(74) Attorney, Agent, or Firm — Barta, Jones & Foley, PLLC

(57) ABSTRACT

A thermoplastic welding assembly and method for joining a plurality of thermoplastic support components to a thermoplastic component is provided. The thermoplastic welding assembly includes a frame, a plurality of heat sinks, and a plurality of individually actuatable pressurizers. The frame includes a plurality of welding slots. Each heat sink of the plurality of heat sinks is positioned within one of the welding slots. Each pressurizer of the plurality of individually actuatable pressurizers includes an alignment actuator configured to move one thermoplastic support component into alignment with one welding slot, and a clamping actuator configured to move the one thermoplastic support component into contact with the thermoplastic component. In some implementations, the thermoplastic welding assembly further includes a plurality of actuators configured to move the alignment actuator and the clamping actuator.

20 Claims, 16 Drawing Sheets

THERMOPLASTIC COMPOSITE INDUCTION WELDING TOOLING FOR RIBS

BACKGROUND

Thermoplastic materials like polyethylene, polyvinyl chloride, nylons, polypropylene, acetals, and the like have become increasingly important as materials of products and machinery because of their moldability, ease of handling, light weight, and ability to withstand corrosion. Often, different thermoplastic materials are joined together for various applications, such as to make aerospace, automotive, mining, or other parts. Numerous techniques have been developed for the joining of thermoplastic materials, including welding and the use of adhesives. Thermoplastic welding is a type of welding for joining pieces of thermoplastic material using heating, pressure and cooling. To begin a thermoplastic weld, the surface of the thermoplastic material is heated to its melting point, or thermoplastic state. Each material has its own thermoplastic state, which usually ranges between 250° C. (480° F.) and 500° C. (1022° F.). The material is then pressed together until it cools. The pressure applied allows molecules in the material to newly position themselves, or to bond with molecules of another part.

Induction welding is one particular type of thermoplastic welding that uses electromagnetic induction to heat components without contacting the components. An induction welding probe emits an inductive field toward two thermoplastic components to be joined, which induces heat in the components and allows them to weld together. Neither component is contacted by the induction coil itself, as only the electromagnetic field is necessary to induce the heat in the components. Induction welding requires that the components remain in contact with each other to induce heating, meld together, and then cool properly to form a strong thermoplastic weld. Conventional benches and presses used for thermoplastic welding may apply an incorrect pressure to the side of the components opposite the welding probe, which frequently results in welding issues like squeeze out or delamination issues. Or, if some sort of bladder is used to push the components together during welding, bladder imprints are often found where the bladder rubbed off, or imprinted, on one of the components. Accordingly, conventional welding benches do not provide mechanisms for holding thermoplastic components together with the correct pressure from various angles or by materials that do not imprint during welding. There is, therefore, a desire for an improved thermoplastic welding assembly and thermoplastic welding method.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

In one implementation, a thermoplastic welding assembly is provided for welding thermoplastic components. The thermoplastic welding assembly includes a frame, a plurality of heat sinks, and a plurality of individually actuatable pressurizers. The frame includes a plurality of welding slots. Each heat sink of the plurality of heat sinks is positioned within one of the welding slots. Each pressurizer of the plurality of individually actuatable pressurizers includes an alignment actuator configured to move one thermoplastic support component into alignment with one welding slot, and a clamping actuator configured to move the one thermoplastic support component into contact with the thermoplastic component.

In another implementation, a thermoplastic welding assembly is provided for welding thermoplastic components. The thermoplastic welding assembly includes a frame, a plurality of individually actuatable pressurizers, and a plurality of actuators. The frame includes a plurality of welding slots. Each pressurizer of the plurality of individually actuatable pressurizers includes an alignment block movable in a first direction to move one thermoplastic support component into alignment with one welding slot, and a clamping block movable in a second direction to move the one thermoplastic support component into contact with the thermoplastic component, wherein the first direction is a different direction than the second direction. The plurality of actuators is configured to move the alignment block and the clamping block.

In another implementation, a method is provided for joining a plurality of thermoplastic support components to a thermoplastic component. The method includes opening a frame to allow for the thermoplastic component and the plurality of thermoplastic support components to be positioned on a clamping block, the frame comprising at least one welding slot; actuating an alignment block to move at least one support component into alignment with the at least one welding slot; actuating a clamping block to clamp the thermoplastic component against a form block; and welding the at least one support component to the thermoplastic component through the at least one welding slot.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Corresponding reference characters indicate corresponding parts throughout the accompanying drawings.

DETAILED DESCRIPTION

Figure 1:
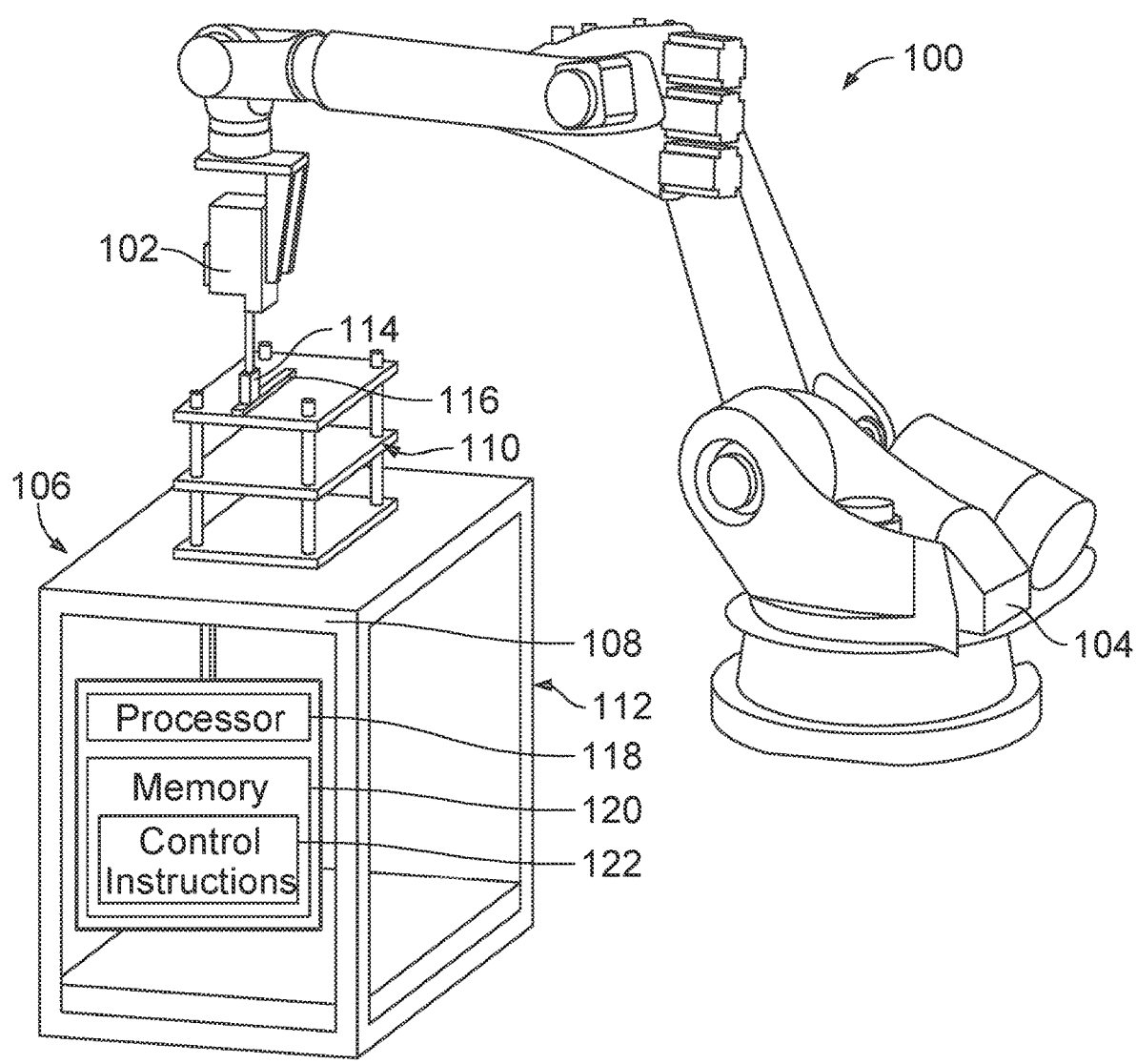
FIG. 1 illustrates a perspective view of a welding configuration according to various implementations of the present disclosure.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

As noted above, conventional benches and presses used for thermoplastic welding may risk applying an incorrect pressure to the side of the components opposite the welding probe, which can result in welding issues like squeeze out or delamination issues. Other conventional benches and presses, even if pressure is applied correctly, may require significant human costs to manually arrange both the structures to be induction welded as well as support structures used to help facilitate the induction welding. These solutions are time consuming, expensive, and prone to less than optimal issues like squeeze out or delamination issues.

In particular, conventional methods of induction welding to address these challenges generally require each weld to be executed individually on a press. In other words, the thermoplastic materials to be induction welded are clamped in place, induction welding occurs, the clamp is removed, one or both of the thermoplastic materials is translated in order to align the next area to be induction welded, clamped, and so forth. There is, therefore, a desire for an improved thermoplastic welding assembly and thermoplastic welding method that enables more cost-efficient thermoplastic welding with increased stabilization for thermoplastic structures in their entirety and allow multiple coils to be used (e.g., simultaneously) to reduce the time required for the induction welding process.

Various thermoplastic welding assemblies are discussed herein that allow users to weld thermoplastic components together using induction welding. The thermoplastic components may be made of thermoplastics, such as Polyetherketoneketone (PEKK), polyaryletherketone (PAEK), or the like; laminate; composite, and any other material suitable for induction welding. The thermoplastic components discussed herein may be made of, partially or wholly, any such materials.

The thermoplastic welding assemblies discussed herein may be used as a bench for positioning two parts to be welded by a welding induction tool and applying appropriate pressure with particular non-inductive materials during the welding process to alleviate various welding irregularities that come from conventional welding benches. In particular, the disclosed thermoplastic welding assemblies use a number of actuators that are used to align and clamp at least one of the thermoplastic components being welded. These actuators are made out of electrically non-conductive and non-ferrous materials. When in contact, the actuators hold the thermoplastic components in place for an induction welding probe to perform an induction weld and afterward in order for the then-welded thermoplastic components to cooldown and the weld to cure.

FIG. 1 illustrates a perspective view of a welding configuration 100 according to various implementations of the present disclosure. The example of the welding configuration 100 is for illustration only. Other implementations may be used without departing from the scope of the present disclosure. For example, the present disclosure contemplates induction welding configurations having different shapes, sizes, configurations, etc.

An induction welding tool 102 is mounted to a robotic arm 104 that moves the welding tool 102 into and out of a thermoplastic welding assembly 106. The thermoplastic welding assembly 106 includes an outer structural shell 108 to support the various parts discussed below. The outer structural shell 108 defines an upper cage 110 for a press and various pressurizers to hold the thermoplastic components being welded and a lower cage 112 to store various actuators for opening the press and moving the pressurizers into place. In some implementations, the outer structural shell 108 is or creates a bench, as described in greater detail below.

It should be understood that although the upper cage 110 is illustrated in FIG. 1 as provided in a rectangular shape, various implementations are possible. The upper cage 110 is provided in the shape of the components to be welded. For example, when welding the thermoplastic component 312 and the thermoplastic support component 314 illustrated in FIGS. 3A-10 below, the outer cage 110 is provided in a triangular shape to facilitate the induction welding of the thermoplastic component 312 and the thermoplastic support component 314 in a triangular shape.

Only the outer structural shell 108 of the thermoplastic welding assembly 106 is shown in welding configuration 100 for clarity. The various internal components are depicted in subsequent FIGS. 3A-10 and discussed in more detail below.

In some implementations, the lower cage 112 includes a processor 118 and computer-storage memory 120. Software and/or firmware control instructions 122 are stored in the memory 120 and executable by the processor 118 to move the frame 302 and actuators 409, 413, described in greater detail below, based on various inputs being received at the thermoplastic welding assembly 106 or another device configured to control operation of the thermoplastic welding assembly 106. Accordingly, the control instructions 122 selectively activate the actuator 409 and the actuator 413 depending on the particular input received. For instance, the control instructions 122 executable code including instructions that, when executed, cause the processor 118 detect that a particular input is received or detected and consequently open the frame 302 by moving the upper portion 304 and/or the lower portion 306 away from each other. The control instructions 122 further include executable code including instructions that, when executed, close the frame 302 and actuate one or both of the actuator 409 and the actuator 413.

The processor 118 may include any quantity of central processing units (CPUs), electrical controllers, microcontrollers, application-specific integrated circuits (ASICs), systems on chip (SoC), or other processing units configured to execute the control instructions 122 and/or some or all of the operations in the flow charts discussed below and depicted in the accompanying figures. Moreover, in some implementations, the processors 118 represent an implementation of analog techniques to perform the control instructions 122 and operations described herein.

The memory 120 may take the form of the computer-storage memory device referenced below and operatively provide storage of computer-readable instructions, data structures, program modules and other data for the thermoplastic welding assembly 106. Aside from the control instructions 122, the memory 120 stores one or more of an operating system (OS), a universal application platform, or other program modules and program data. The memory 120 is thus able to store and access data that are executable by processor 118 and configured to carry out the various operations disclosed herein. In some implementations, the memory 120 stores executable computer instructions for an OS and various software applications. The OS may be any OS designed to the control the functionality of the thermoplastic welding assembly 106, including, for example but without limitation: WINDOWS® developed by the MICROSOFT CORPORATION®, MAC OS® developed by APPLE, INC.® of Cupertino, Calif, ANDROID™ developed by GOOGLE, INC.® of Mountain View, Calif., open-source LINUX®, and the like.

By way of example and not limitation, computer-readable media, as referenced herein, comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable control instructions 122 may be organized into one or more computer-executable components or modules stored in the memory 120. Generally, program modules include, but are not limited to, routines, programs, objects, components, and data structures that perform particular tasks or implement particular abstract data types. Aspects of the present disclosure may be implemented with any number and organization of such components or modules. For example, aspects of the disclosure are not limited to the specific computer-executable instructions, components, or modules illustrated in the figures and described herein. Other implementations of the disclosure may include different computer-executable instructions or components having more or less functionality than illustrated and described herein. In implementations involving a general-purpose computer, aspects of the disclosure transform the general-purpose computer into a special-purpose computing device, CPU, electrical controller, microcontroller, ASIC, SoC, or other processing unit for specifically controlling and operating the thermoplastic welding assembly 106.

As will be appreciated, any suitable program code instructions may be loaded onto the memory 120 to produce a particular machine, such that the particular machine becomes a means for implementing the functions specified herein. These control instructions 122, when loaded into the memory 120 for execution by the processor 118, create the specific electrically controlled thermoplastic welding assembly 106 described herein. In other words, embodiments having processor 118 and the memory 120 executing and storing the control instructions 122 constitute a specific processing device that for controlling thermoplastic welding in the particular thermoplastic welding assemblies 106 described herein.

The robotic arm 104 operates to move and insert a welding probe 114, such as an induction welding probe, of the welding tool 102 into a slot 116 defined in the upper cage 110 and throughout the press housed therein. In some implementations, the induction welding probe 114 includes an induction coil that may be selectively operated to inductively weld the thermoplastic components. In operation of such implementations, thermoplastic components are held together in the press within the upper cage 110 using the assembly parts discussed below, and the induction welding probe 114 is inserted through the slot 116 and used to inductively weld the thermoplastic components together.

It should be understood that the welding configuration 100 of FIG. 1 is only one example, or implementation, of a welding configuration. Alternative examples of welding configurations use different robotic arms 104 to control the welding tool 102, and others do not use a robotic arm 104 at all, relying instead on manual movement of the welding tool 102. Still other examples use a welding tool 102 that is supported by a robotic arm and also manually guided into and out of the slot 116. Numerous different configurations are fully contemplated by this disclosure.

Figure 2:
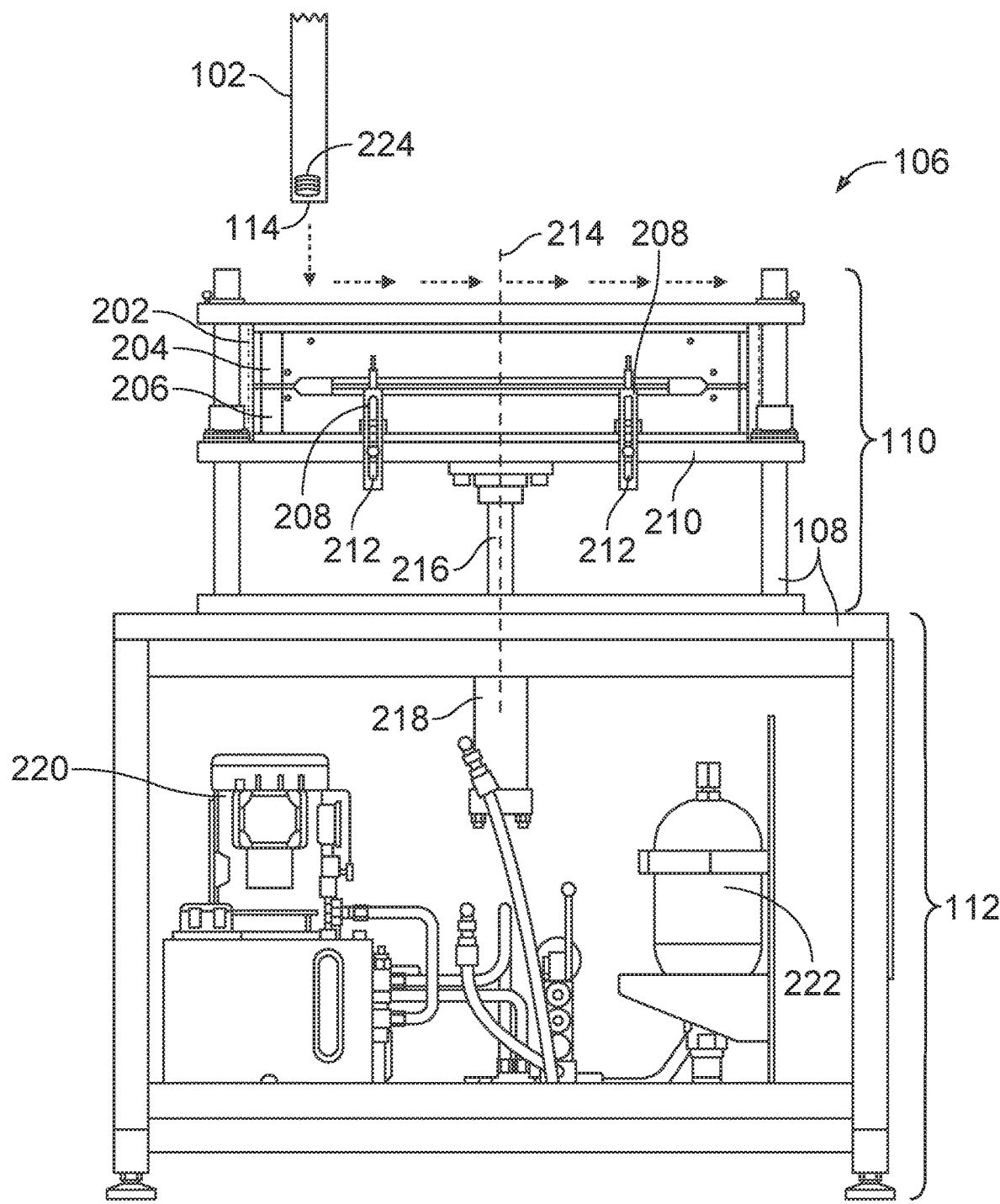
FIG. 2 illustrates a side view of a thermoplastic welding assembly according to various implementations of the present disclosure.

FIG. 2 illustrates a side view of the thermoplastic welding assembly 106 for joining a first thermoplastic component to a second thermoplastic component using thermoplastic welding, according to various implementations of the present disclosure. The thermoplastic welding assembly 106 includes the outer structural shell 108 that defines the upper cage 110. The upper cage 110 houses and supports a press 202 that is made up of a first portion 204 and a second portion 206. Movable plate brackets 208 anchor the second portion 206 to a base plate 210 and are movable along bracket tracks 212 vertically along vertical axis 214.

For clarity, the majority of examples discussed herein refer to a vertical press, or frame, 202 with the first portion 204 and the second portion 206. For clarity, some examples discussed herein refer to a vertical press 202, where the first portion 204 is a flat, upper plate and the second portion 206 is a flat, lower plate. Alternative examples can use a horizontal press with parallel plates that are positioned horizontally next to each other and movable along a horizontal axis and/or the first portion 204 and/or the second portion 206 provided in a shape other than a flat plate. For example, as illustrated in FIGS. 3A-10 below, the first portion 204 can be provided in a triangular shape while the second portion 206 is provided in a flat shape. In other implementations, the first portion 204 can be provided in a flat shape and the second portion 206 can be provided in a triangular shape.

Both configurations are fully contemplated: vertical presses 202 with first and second plates 204, 206 that move vertically and horizontal presses with side plates that move horizontally. To aid the reader, only vertical presses 202 are discussed, but examples may use any type of press, and the appended claims refer to presses that are formed with first and second plates 204, 206 to contemplate different configurations.

In some implementations, the first portion 204 and the second portion 206 are made of a metal frame and include various non-conductive tooling inserts (discussed below). The non-conductive inserts may be formed of different types of non-conductive materials, such as for example but without limitation, plastics, rubbers, polyurethane, foam boards, polyurethane foam boards, woods, phenolic laminates, and the like. As shown in more detail in FIGS. 3A-10 and discussed below, the first portion 204 and the second portion 206 may each include various modular tooling inserts comprising multiple different non-conductive inserts that fit particular contours and shapes of the thermoplastic components being welded. For example, the first portion 204 may be made up of two, three, four, or more non-conductive tooling inserts that fit together to define the slot 116 for the induction welding probe 114 of the welding tool 102. Additionally or alternatively, the tooling inserts of the second portion 206 may each be made up of two, three, four, or more non-conductive plates that fit together to define specific plunger cavities for the plungers and pressurizers discussed below.

It also should be noted that the metallic frames of the first portion 204 and the second portion 206 are strategically positioned at distances away from the targeted welding joints of the thermoplastic components so as not to interfere with inductive welding. In some implementations, the metallic frames of one or both of the of the first portion 204 and the second portion 206 are located more than 100 millimeters (mm) away from the induction welding probe 114. Other distances are used in different alternative implementations.

In some implementations, the press 202 is a hydraulic press with a hydraulic actuated metallic frame. Alternative implementations use a pneumatic, electrical, or other type of press 202. In operation, the press 202 may be opened to load thermoplastic components to be welded and closed to hold the thermoplastic components during and after the welding by moving the first portion 204 and/or the second portion 206 toward or away from each other along depicted vertical axis 214.

In some implementations, a press actuating arm 216 in the upper cage 110 opens and closes the press 202. The press actuating arm 216 moves in and out of a sleeve 218 and, in some implementations, is driven by one or more actuators that are contained and supported in the lower cage 112.

A press actuator 220, which may be an electric, mechanical, hydraulic, or pneumatic motor provides the motive force for moving the press actuating arm 216 up or down along the vertical axis 214. Other implementations move the press actuating arm 216 in different directions to open and close the press 202. Some implementations vertically move the first portion 204 while keeping the second portion 206 stationary. Other implementations vertically move the second portion 206 while keeping the first portion 204 stationary. Still other implementations vertically move the both the first portion 204 and the second portion 206.

Additionally, an actuator 222 is housed and supported in the lower cage 112. The actuator 222 may be an electric, mechanical, hydraulic, or pneumatic motor that moves the plungers, pressurizes, and actuators discussed below and shown in FIGS. 3A-10. In this manner, the actuator 222 is configured to supply the force (e.g., electric, mechanical, pneumatic, hydraulic, etc.) to move the disclosed plungers referenced below. In some implementations, the actuator 222 is configured to supply mechanical force to move the actuators described herein. In some implementations, the actuator 222 is a bench actuator configured to open and close a frame, such as the frame 302 described in greater detail below. In one implementation, the bench actuator 222 is a hydraulic actuator.

Once the press 202 is loaded with the thermoplastic components to be welded, the welding tool 102 is inserted through the slot 116 to perform the thermoplastic welding, first downward through the slot 116 and then horizontally along the thermoplastic components—as indicated by the dotted arrows. In some implementations, as described in greater detail below, the induction welding probe 114 is inserted through one of the welding slots 308a, 308b, 308n and then moved vertically along the thermoplastic component 312 to induction weld the thermoplastic component 312 to the thermoplastic support component 314. In some implementations, as shown in FIGS. 3C and 7A-9B, the induction welding probe 114 is inserted through the longitudinal welding slot 310, 801 and then moved along the longitudinal welding slot 801 to induction weld the first portion of the thermoplastic component 312a to the second portion of the thermoplastic component 312b. In some implementations, the welding tool 102 includes an induction coil 224 in the induction welding probe 114.

The induction coil 224 is operable to perform the thermoplastic weld through induction welding, electromagnetically heating the thermoplastic material of the thermoplastic components to thereby fusing the two thermoplastic components together. For example, the induction coil 224 may provide a voltage at a specified frequency, such as between 10 kHz and 1 MHz, to inductively weld the thermoplastic components together.

In one implementation, the two thermoplastic components are inductively heated at a weld interface between the two components to form a single aggregate component. For example, a skin may be welded to a stringer or a rib, two plastic skins may be collectively welded together to form an airplane part, automotive part, motorcycle part, or the like; a foil may be welded to a plastic container; and myriad other uses exist and are fully contemplated. For instance, the airplane part may be a part of wing, or the automobile part may be a leather seat. Thus, the thermoplastic components may be welded to collectively form an airplane part, an automotive part, a boat part, or the like.

As described herein, the thermoplastic welding process has demanding, inherent requirements for a proper induction weld. These requirements include, but are not limited to, high clamping loads, a high thermal environment, non-ferrous materials, restricting interference from the tooling close to the coil, maintaining uniform pressure and temperature throughout the induction welding process, and so forth in addition to maintaining cost efficient tooling. Current solutions fail to provide sufficient thermal and pressure management on either side of the joint area, which can result in an imprint of the pressure bladder on the finished product, lead to limitations in the thickness of the structure due to overheating, and/or result in an increased gap on the rib not being fully welded.

Accordingly, the various implementations of the present disclosure addresses these deficiencies by applying consolidation force throughout a welding operation using non-conductive materials. The thermoplastic welding assembly utilizes materials to manage the thermal requirement generated by the thermoplastic welding operation at either side of the joint, such as a joint for multiple ribs joined to skins. Examples of such a joint included a rudder or an edge. The thermoplastic welding assembly is operable to be reconfigurable for various tooling components for a variety of engineering structural shapes and allows for optimized processing by stabilizing the structure and allowing for multiple simultaneous welds. Various implementations provide a frame that includes a combination of pneumatic bladders and actuators to align and clamp a thermoplastic component to be induction welded.

Figure 3A:
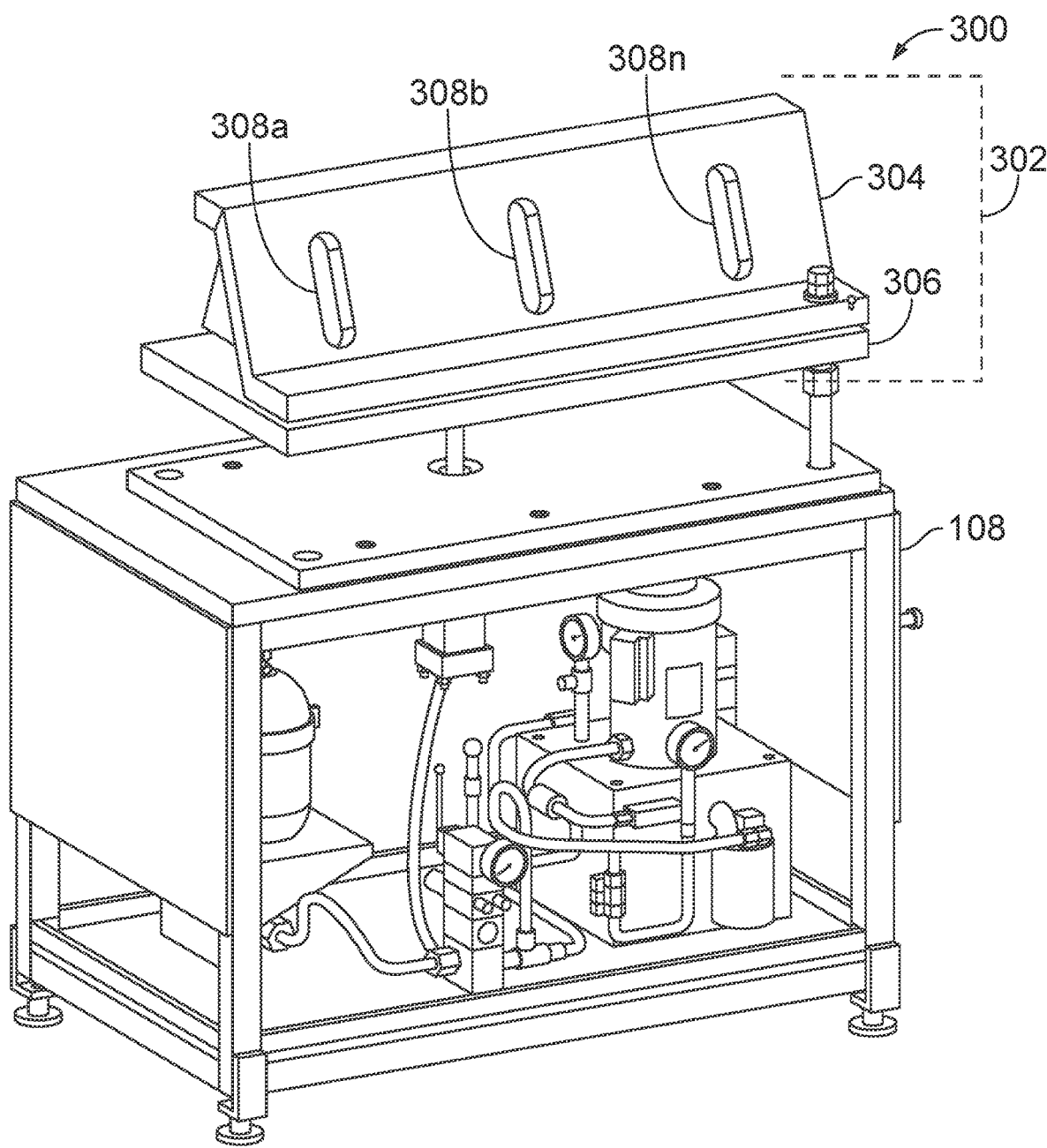
FIG. 3A illustrates a perspective view of a first side of the thermoplastic welding assembly according to various implementations of the present disclosure.
Figure 3B:
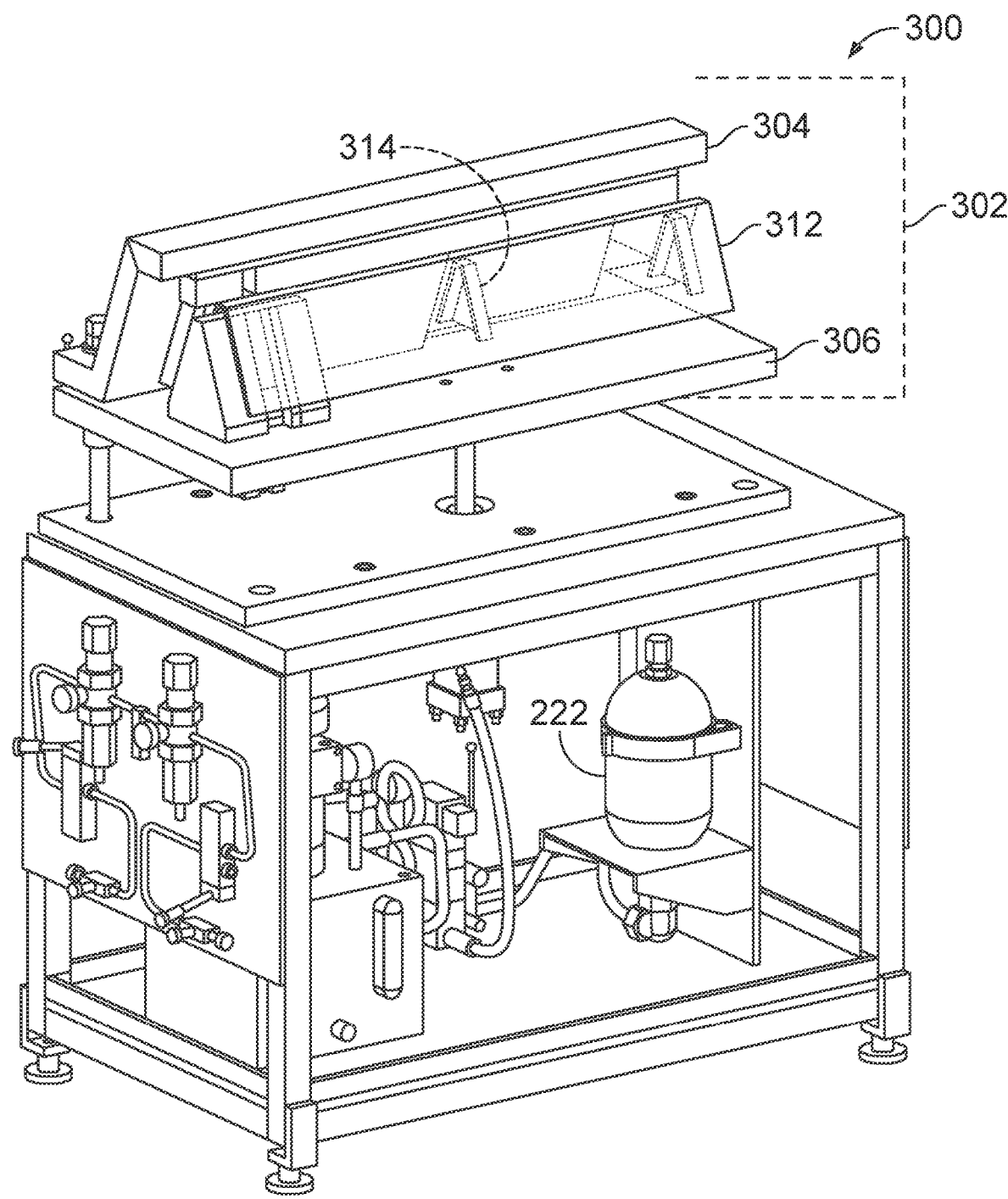
FIG. 3B illustrates a cutaway view of a second side of the thermoplastic welding assembly according to various implementations of the present disclosure.
Figure 3C:
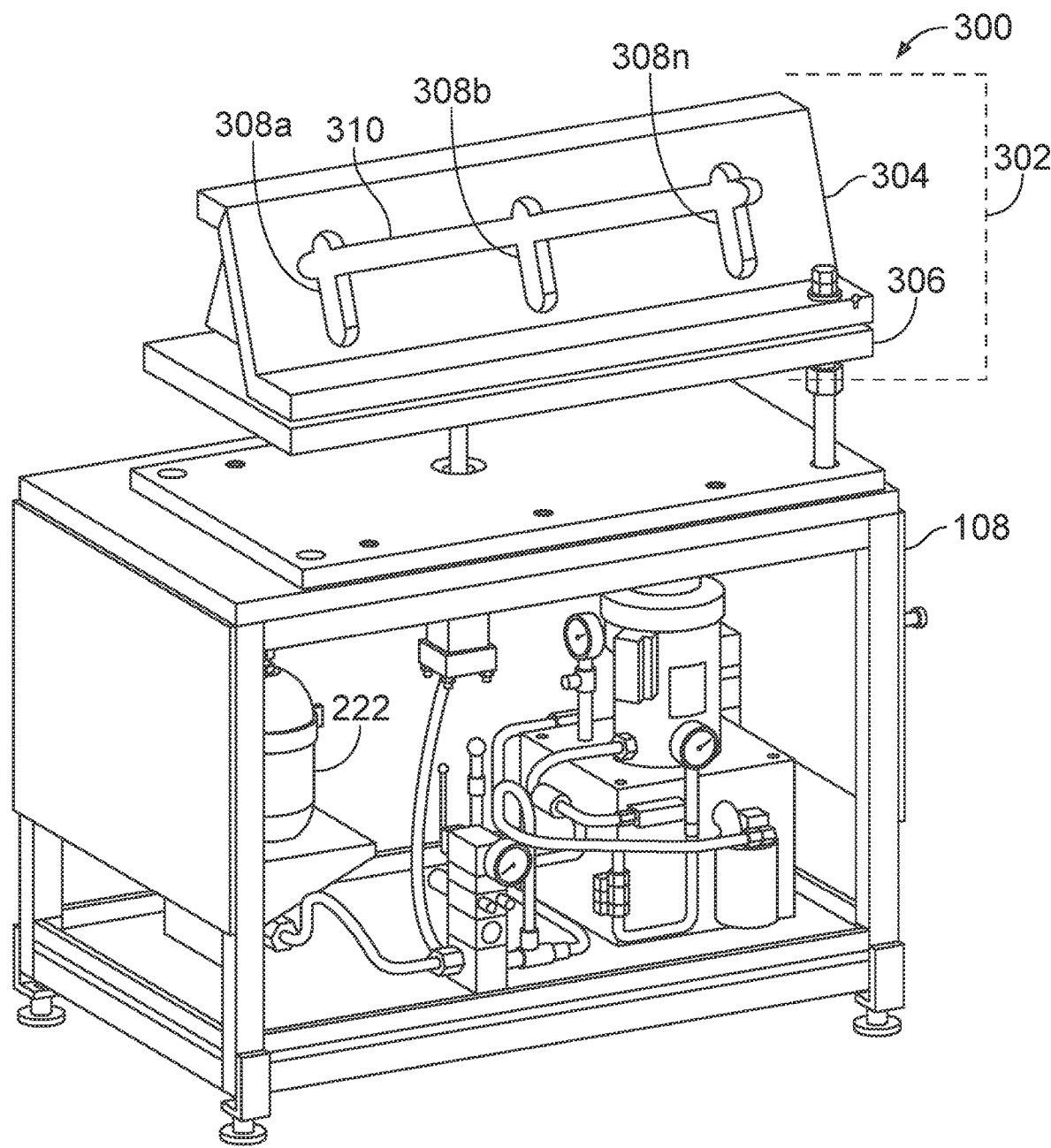
FIG. 3C illustrates a perspective view of a first side of the thermoplastic welding assembly according to various implementations of the present disclosure.

FIG. 3A illustrates a perspective view of a first side of the thermoplastic welding assembly according to various implementations of the present disclosure. FIG. 3B illustrates a cutaway view of a second side of the thermoplastic welding assembly according to various implementations of the present disclosure. FIG. 3C illustrates a perspective view of a first side of the thermoplastic welding assembly according to various implementations of the present disclosure, in particular a different implementation than the first side of the thermoplastic welding assembly illustrated in FIG. 3A. The example of the thermoplastic welding assembly 300 is for illustration only. Other implementations may be used without departing from the scope of the present disclosure. For example, the present disclosure contemplates thermoplastic welding assembly configurations having different shapes, sizes, configurations, etc.

The thermoplastic welding assembly 300 is a hydraulic and pneumatic system that includes a frame 302 situated on a bench, such as the outer structural shell 108. In some implementations, the thermoplastic welding assembly 300 is the thermoplastic welding assembly 106. The frame 302 comprises an upper portion 304 and a lower portion 306 arranged such that the lower portion 306 is provided in between the outer structural shell 108 and the upper portion 304, as illustrated in FIGS. 3A-3C. In some implementations, the frame 302 is the press 202, the upper portion 304 is the first portion 204, and the lower portion 306 is the second portion 206. The lower portion 306 provides a base of the frame and is provided in a rectangular or square shape. The upper portion 304 includes two sides, each of which are provided relative to the lower portion 306 at an angle less than ninety degrees. The two sides meet opposite of the lower portion 306 such that, when viewed from a side angle, the upper portion 304 and the lower portion 306 create a triangle shape.

Within the frame 302, various thermoplastic components can be provided to be induction welded. For example, as described in the description of FIG. 2, the upper portion 304 and the lower portion 306 are separable to enable the thermoplastic components to be situated within the frame 302 for induction welding. In some implementations, the lower portion 306 is configured to be lowered to the outer structural shell 108. In some implementations, the upper portion 304 is configured to be raised away from the outer structural shell 108. In some implementations, the lower portion 306 is configured to be lowered to the outer structural shell 108 and the upper portion 304 is configured to be raised away from the outer structural shell 108. In some implementations, the upper portion 304 and the lower portion 306 are moved by the actuator 222. The actuator 222 can be a bench actuator configured to close and open the frame 302 by moving the upper portion 304 and the lower portion 306 toward and away from each other, respectively. As described in greater detail below, the upper portion 304 and the lower portion 306 are separated, the thermoplastic components are situated within the frame 302, and the upper portion 304 and the lower portion 306 are brought back together for the induction welding to be performed.

In some implementations, the thermoplastic components to be induction welded include a thermoplastic component 312 and a plurality of thermoplastic support components 314. The thermoplastic component 312 can be a skin and each thermoplastic support component 314 can be an individual rib. In various implementations, a final product of the induction welding process includes a first portion of the thermoplastic component 312a induction welded to a second portion of the thermoplastic component 312b at an angle less than 180 degrees and one or more thermoplastic support components 314 induction welded to one or both of the thermoplastic components 312.

Each side of the upper portion 304 includes a plurality of welding slots 308a, 308b, 308n. Although illustrated in FIG. 3A as comprising three such welding slots, the example provided in FIG. 3A should not be construed as limiting. Various implementations are possible. For example, the upper portion 304 can include more than three welding slots 308 or fewer than three welding slots 308 without departing from the scope of the present disclosure. Each of the welding slots 308 are configured to receive a welding probe, such as the induction welding probe 114, to execute an induction welding process on one or more thermoplastic components contained within the frame 302.

In some implementations, each of the welding slots 308 is elongated to receive the induction welding probe 114. The induction welding probe 114 is inserted through the welding slot 308 to perform induction welding between the thermoplastic component 312 and the thermoplastic support component 314. The elongated shape of the welding slot 308 enables the induction welding probe 114 to move along the width of the thermoplastic component 312 as the induction welding process of the thermoplastic component 312 to the thermoplastic support component 314 occurs. Although described herein as receiving the induction welding probe 114, various implementations are possible. In one implementation, the thermoplastic welding assembly 300 includes a plurality of induction welding probes 114, each of the plurality of welding probes positioned within one of of welding slots 308a, 308b, 308n to weld the thermoplastic support components 314 to the thermoplastic component 312 simultaneously.

In some implementations, for example as illustrated in FIG. 3C, the frame 302 further includes one or more longitudinal welding slots 310. Each longitudinal welding slot 310 is configured to receive one or more welding probes, for example the induction welding probe 114, to enable induction welding of a first portion of the thermoplastic component 312a to a second portion of the thermoplastic component 312b. In these implementations, as illustrated in FIG. 3C, the one or more longitudinal welding slots 310 are provided in addition to the welding slots 308a, 308b, 308n. In some implementations, the one or more longitudinal welding slots 310 are provided on the upper portion 304 and the welding slots 308a, 308b, 308n are not included on the upper portion 304.

In some implementations, the thermoplastic welding assembly 300 further includes a plurality of heat sinks, such as the heat sink 411 illustrated in FIG. 4 and described in greater detail below, positioned within the welding slot 308. In other words, each of the plurality of welding slots 308a, 308b, through 308n includes one or more heat sinks 411. Each of the one or more heat sinks 411 dissipates heat during the induction welding process between thermoplastic components. For example, the welding slot 308a includes one or more heat sinks 411 to dissipate heat during the induction welding of the thermoplastic component 312 to the thermoplastic support component 314 at the location of the welding slot 308a. Each of the heat sinks 411 further has a width that is wider than the width of the induction welding probe 114 to further facilitate the dissipation of the heat during the induction welding.

In implementations where the thermoplastic welding assembly 300 further includes one or more longitudinal welding slots 310, the thermoplastic welding assembly 300 additionally includes one or more longitudinal heat sinks 701 positioned within the longitudinal welding slot. The one or more longitudinal heat sinks 701 dissipate heat during the induction welding process of the first portion of the thermoplastic component 312a to the second portion of the thermoplastic component 312b. Each of the one or more longitudinal heat sinks 701 further has a width that is wider than the width of the induction welding probe 114 to further facilitate the dissipation of the heat during the induction welding.

Various implementations of the present disclosure recognize and take into account the need to stabilize the ribs-to-skin thermoplastic component structure in its entirety. Stabilizing the entirety of the ribs-to-skin thermoplastic component structure enables multiple coils to be used in the induction welding process in order to reduce the time required to complete the induction welding process, as well as enables an individualized pressure application to counteract pressure forces through the frame 302 in order to avoid an increase in gaps between parts. By further enabling an individualized pressure application for each particular rib-to-skin application, the stability of the induction welding process is improved, resulting in a higher quality weld at each particular junction between the rib and skin. Accordingly, various implementations of the present disclosure provide an actuatable pressurizer assembly that provides consolidation forces within the constraints of thermoplastic welding operation temperatures using non-conductive material. The thermoplastic welding assembly 300 that includes the actuatable pressurizer assembly 400 enables the thermoplastic components to be reconfigured to accommodate different engineering, structural shapes and the ability to pre-fit, pressurize, and weld a skin to a rib structure, e.g., the thermoplastic component 312 to the thermoplastic support component 314.

Figure 4A:
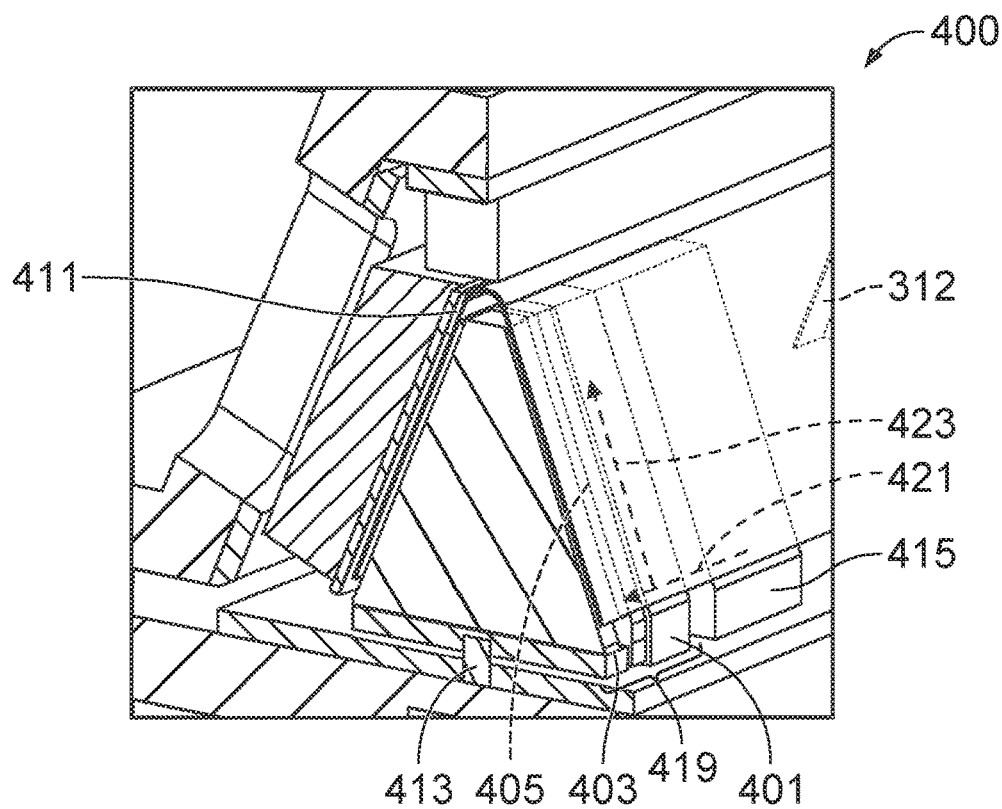
FIG. 4A illustrates a perspective view of an actuatable pressurizer assembly according to various implementations of the present disclosure.
Figure 4B:
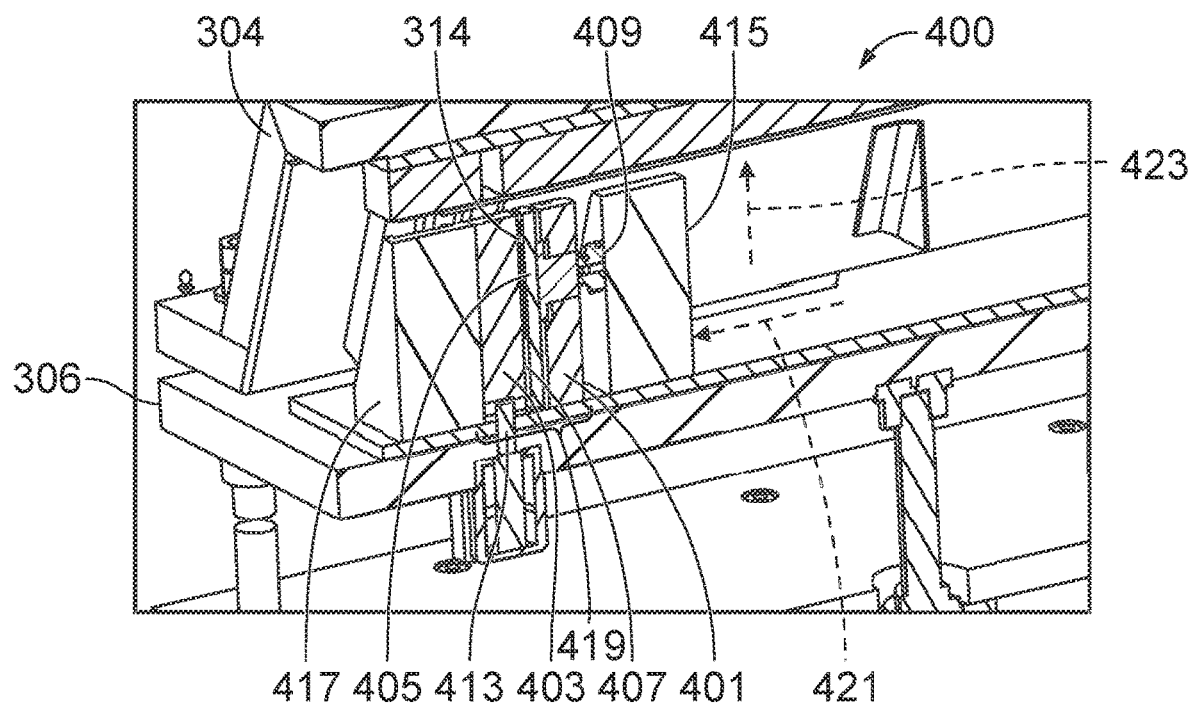
FIG. 4B illustrates a cutaway view of the actuatable pressurizer assembly according to various implementations of the present disclosure.

FIG. 4A illustrates a perspective view of an actuatable pressurizer assembly according to various implementations of the present disclosure. FIG. 4B illustrates a cutaway view of an actuatable pressurizer assembly according to various implementations of the present disclosure. The example of the actuatable pressurizer assembly is for illustration only. Other implementations may be used without departing from the scope of the present disclosure.

The thermoplastic welding assembly 300 includes an actuatable pressurizer assembly 400 according to various implementations of the present disclosure. The actuatable pressurizer assembly 400 includes a plurality of individually actuatable pressurizers 419, each of which includes an alignment actuator 401 and a clamping actuator 403. The alignment actuator 401 and the clamping actuator 403 are independently controlled.

Although FIG. 4A illustrates an actuatable pressurizer assembly that includes a plurality of individually actuatable pressurizers 419 for a particular welding slot, i.e., the welding slot 308a, it should be understood that a separate plurality of individually actuatable pressurizers 419 are provided for each individual welding slot 308a, 308b, 308n. In other words, each of the welding slots 308a, 308b, 308n includes a separate plurality of individually actuatable pressurizers 419. For example, the welding slot 308a includes a separate plurality of individually actuatable pressurizers 419, the welding slot 308b includes a separate plurality of individually actuatable pressurizers 419, the welding slot 308n includes a separate plurality of individually actuatable pressurizers 419, and so forth.

The alignment actuator, or block, 401 is configured to move one thermoplastic support component 314 into alignment with one of the welding slots 308. For example, the alignment actuator 401 moves laterally in a first direction 421 atop the lower portion 306 to position the thermoplastic support component 314 against a form block 405, which aligns the thermoplastic support component 314 with the particular welding slot 308a. More particularly, the form block 405 includes a tool locator 407, against which the alignment actuator 401 positions the thermoplastic support component 314. In some implementations, the alignment actuator 401 moves laterally based on the actuation of an actuator 409. In some implementations, the actuator 409 is a pneumatic actuator. However, other implementations are possible. In various implementations, the actuator 409 can be a hydraulic actuator, an electric actuator, or any other suitable type of actuator.

The clamping actuator, or block, 403 is configured to move the thermoplastic support component 314 into contact with the thermoplastic component 312. For example, the clamping actuator 403 is actuated by an actuator 413 to clamp the thermoplastic support component 314 to the thermoplastic component 312 using the form block 405. In some implementations, the clamping actuator 403 moves vertically, i.e., away from and toward the lower portion 306 of the frame 302, in a second direction 423 based on the actuation of the actuator 413. In some implementations, the actuator 413 is a hydraulic actuator. However, other implementations are possible. In various examples, the actuator 413 can be a pneumatic actuator, an electric actuator, or any other suitable type of actuator.

As described herein, the alignment actuator 401 moves laterally in a first direction 421 and the clamping actuator 403 moves vertically in a second direction 423. In one implementation, the difference between the first direction 421 and the second direction 423 is approximately ninety degrees. However, various implementations are possible and the first direction 421 and the second direction 423 can differ by as little as 70 degrees or as much as 110 degrees.

Also illustrated in FIG. 4B are two fixed supports 415, 417. The fixed supports 415, 417 are fixed, i.e., do not move, upon the lower portion 306 of the frame 302. The alignment actuator 401, the clamping actuator 403, the form block 405, the tool locator 407, and the thermoplastic support component 314 are provided between the fixed support 415 and the fixed support 417. The fixed supports 415, 417 support the thermoplastic component 312 during the induction welding process. The exterior shape of the two fixed supports 415, 417 is approximately the same as the interior shape of the upper portion 304 and the two fixed supports 415, 417 are approximately the same shape as the alignment actuator 401, the clamping actuator 403, the form block 405, the tool locator 407, and the thermoplastic support component 314.

The alignment actuator 401, the clamping actuator 403, and the two fixed supports 415, 417 are comprised of one or more non-ferrous, non-conductive materials so as to not interfere with the induction welding process. In various implementations, one or more of the alignment actuators 401, the clamping actuator 403, and the two fixed supports 415, 417 are comprised of a polyurethane board, a polyurethan foam, a thermoset resin/wood fiber reinforced laminate material, or any other suitable material.

Figure 5:
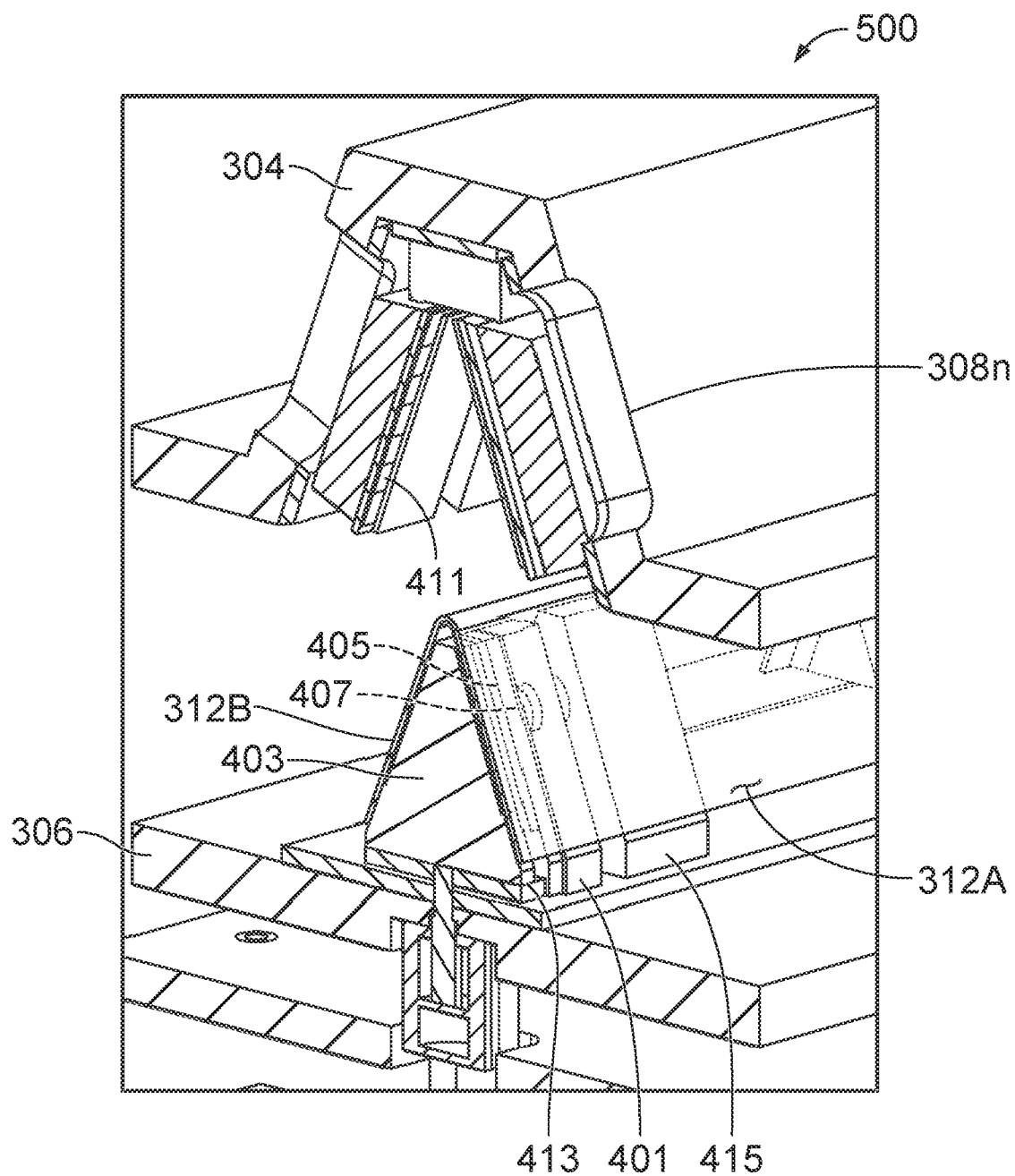
FIG. 5 illustrates a perspective, cutaway view of the thermoplastic welding assembly 300 with an open frame according to various implementations of the present disclosure.

FIG. 5 illustrates a perspective, cutaway view of the thermoplastic welding assembly 300 with an open frame according to various implementations of the present disclosure. The example of the thermoplastic welding assembly is for illustration only. Other implementations may be used without departing from the scope of the present disclosure.

The thermoplastic welding assembly 500, illustrated in FIG. 5, can be the thermoplastic welding assembly 300 and/or the thermoplastic welding assembly 106. For example, the thermoplastic welding assembly 500 includes the upper portion 304 and the lower portion 306. As illustrated in FIG. 5, the frame 302 is in the open position, as indicated by the separation between the upper portion 304 and the lower portion 306. In the open position, the thermoplastic component 312 has been placed on the alignment actuator 401, the clamping actuator 403, the form block 405, the fixed supports 415, 417 and the thermoplastic support component 314 in preparation for induction welding to the thermoplastic support component 314. In some implementations, the thermoplastic component 312 includes each of the first portion of the thermoplastic component 312a and the second portion of the thermoplastic component 312b placed as a single component on two sides of the alignment actuator 401, the clamping actuator 403, the form block 405, the fixed supports 415, 417 and the thermoplastic support component 314. In other implementations, the first portion of the thermoplastic component 312a and the second portion of the thermoplastic component 312b are separately placed on different sides of the alignment actuator 401, the clamping actuator 403, the form block 405, the fixed supports 415, 417 and the thermoplastic support component 314 and are later joined together, such as via induction welding.

The thermoplastic welding assembly 500 further includes a plurality of heat sinks 411 placed on an interior of the upper portion 304. As illustrated in FIG. 5, the plurality of heat sinks 411 are aligned at approximately the same angle created by the thermoplastic component 312 on the lower portion 306. This alignment enables the plurality of heat sinks 411 to be utilized for induction welding of various points of the thermoplastic component 312 to the various points of the thermoplastic support component 314.

Figure 6:
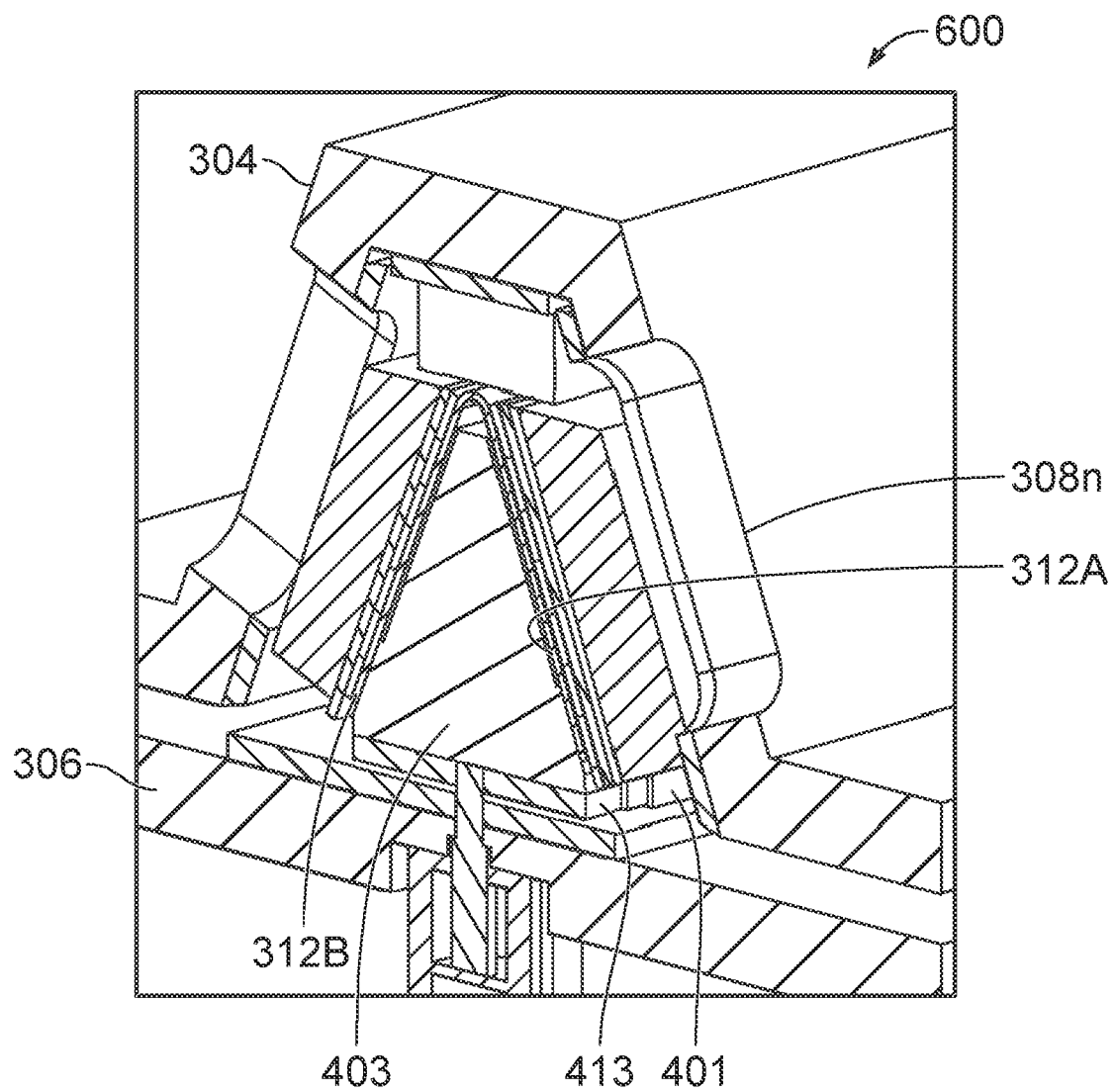
FIG. 6 illustrates a perspective, cutaway view of the thermoplastic welding assembly 300 with a closed frame according to various implementations of the present disclosure.

FIG. 6 illustrates a perspective, cutaway view of the thermoplastic welding assembly 600 with a closed frame according to various implementations of the present disclosure. The example of the thermoplastic welding assembly is for illustration only. Other implementations may be used without departing from the scope of the present disclosure.

The thermoplastic welding assembly 600, illustrated in FIG. 6, can be the thermoplastic welding assembly 300, the thermoplastic welding assembly 106, and/or the thermoplastic welding assembly 500. In one particular implementation, the thermoplastic welding assembly 600 illustrates the thermoplastic welding assembly 500, but with the frame 302 in the closed position rather than the open position illustrated in FIG. 5. For example, the thermoplastic welding assembly 600 includes the upper portion 304 in closer proximity to the lower portion 306 than as illustrated in the open position as in FIG. 5.

As illustrated in FIG. 6, the thermoplastic component 312 is provided on the lower portion 306 at approximately the same angle as the interior of the upper portion 304. The complementary angles of the interior of the upper portion 304 and the thermoplastic component 312 enable the frame 302 to be closed in a manner that enables the thermoplastic component 312 to be pressed to the thermoplastic support component 314 for induction welding.

Figure 7A:
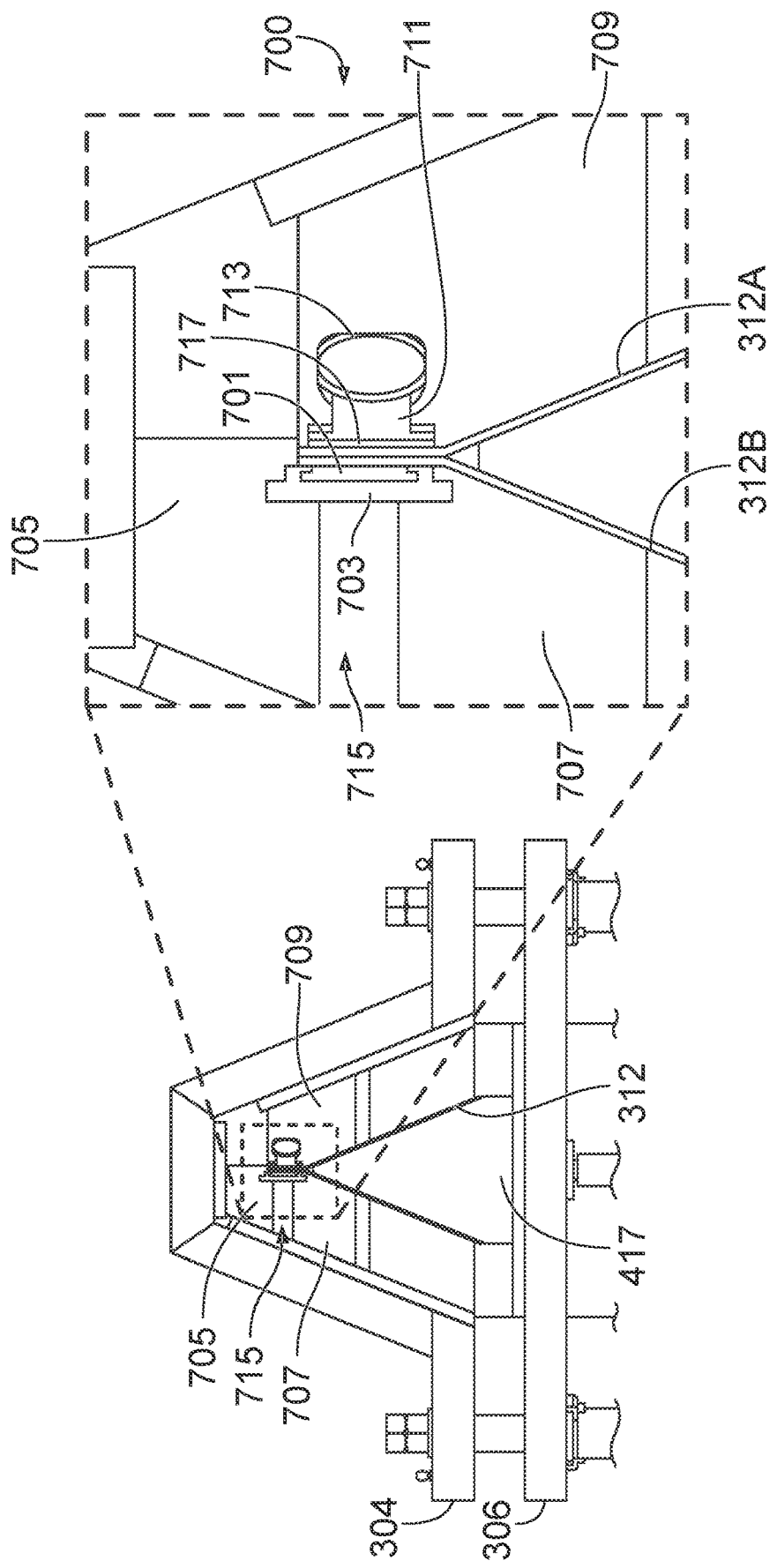
FIG. 7A illustrates a side, cutaway view of the thermoplastic welding assembly according to various implementations of the present disclosure.
Figure 7B:
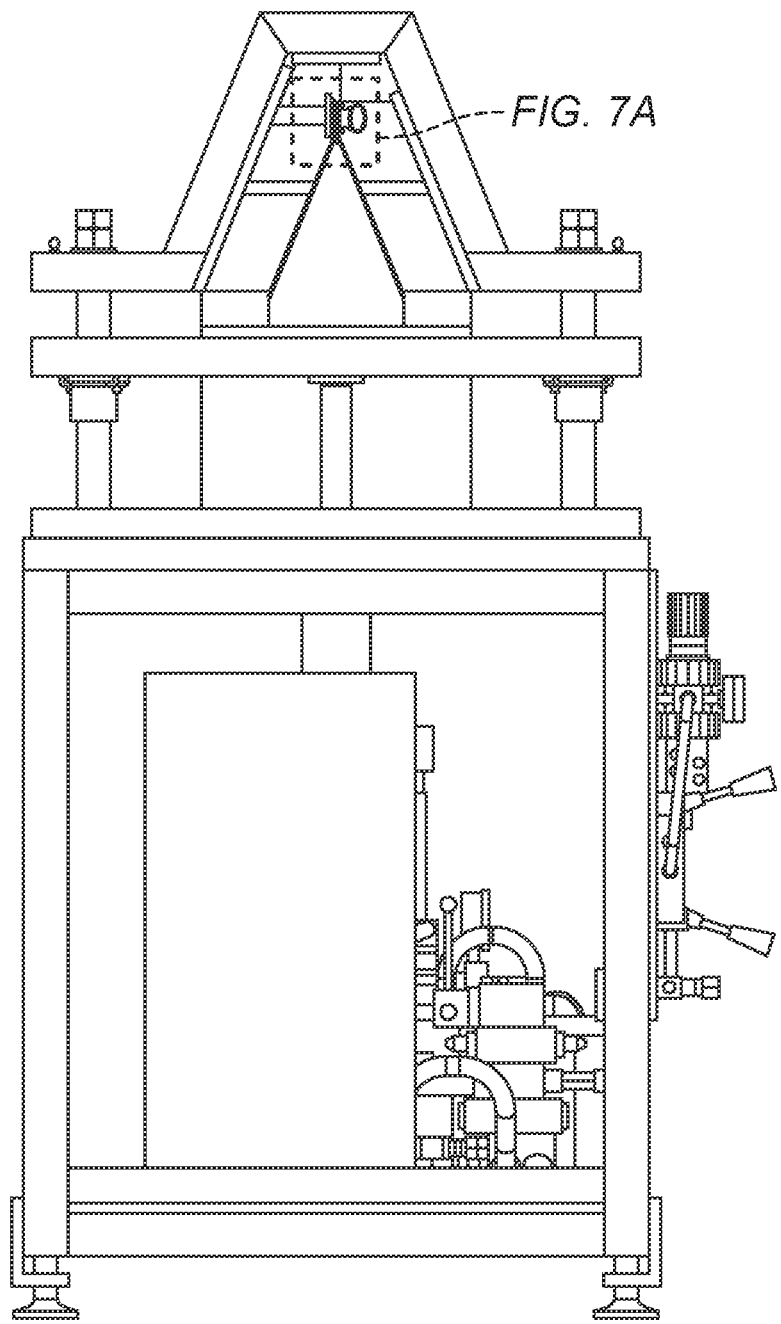
FIG. 7B illustrates a side view of the thermoplastic welding assembly according to various implementations of the present disclosure.

FIG. 7A illustrates a side, cutaway view of the thermoplastic welding assembly according to various implementations of the present disclosure. FIG. 7B illustrates a side view of the thermoplastic welding assembly according to various implementations of the present disclosure. The example of the thermoplastic welding assembly is for illustration only. Other implementations may be used without departing from the scope of the present disclosure.

In particular, FIGS. 7A and 7B illustrate an implementation where a single tool can be utilized to perform induction welding both between the thermoplastic component 312 and one or more thermoplastic support components 314 and between the first portion of the thermoplastic component 312a and the second portion of the thermoplastic component 312b. In other words, the implementation illustrated in FIGS. 7A and 7B provides thermoplastic skin closing out and rib joining in a single tool.

As illustrated in FIGS. 7A and 7B, the thermoplastic welding assembly 500 includes the upper portion 304 and lower portion 306 of the frame 302. In some implementations, the thermoplastic welding assembly 700 is the thermoplastic welding assembly 300 and/or the thermoplastic welding assembly 106. The side, cutaway view illustrated in FIG. 7A particularly illustrates the junction of the first portion of the thermoplastic component 312a and the second portion of the thermoplastic component 312b. The side, cutaway view illustrated in FIG. 7A further illustrates the fixed support 417 and the thermoplastic component 312 atop the fixed support 417. Between the thermoplastic component 312 and the upper portion 304 is a plurality of non-conductive support pieces 705, 707, 709. In various implementations, the plurality of non-conductive support pieces 705, 707, 709 are comprised of a polyurethane board, a polyurethan foam, a thermoset resin/wood fiber reinforced laminate material, or any other suitable material. In some implementations, the frame 302 is vacuum sealed to hold the skin, i.e., the thermoplastic component 312, on the fixed supports 415, 417.

The thermoplastic welding assembly 700 further includes a longitudinal heat sink 701 disposed adjacent to the first portion of the thermoplastic component 312a. The longitudinal heat sink 701 is a ceramic insert and provided within the longitudinal welding slot 715, described in greater detail below. A ceramic holder 703 is provided adjacent to the longitudinal heat sink 701 such that the longitudinal heat sink 701 is disposed between the ceramic holder 703 and the first portion of the thermoplastic component 312a. In some implementations, the longitudinal heat sink 701 is provided as a portion of the ceramic holder 703. In other implementations, the longitudinal heat sink 701 is surrounded on three sides by the ceramic holder 703 such that the ceramic holder 703 provides structural support to the longitudinal heat sink 701.

A polymer support piece 717 is provided adjacent to the second portion of the thermoplastic component 312b. The polymer support piece 717 provides high temperature resistance up to a range of between 250° C. (480° F.) and 500° C. (1022° F.), i.e., the temperature ranges required for induction welding of thermoplastic materials, and structural support throughout the induction welding process. A non-conductive support piece 711 is additionally provided adjacent to the polymer support piece 717. In various implementations, the non-conductive support piece 711 is comprised of a polyurethane board, a polyurethan foam, a thermoset resin/wood fiber reinforced laminate material, or any other suitable material. The non-conductive support piece 711 is supported by a bladder 713 that can inflate to provide support to the non-conductive support piece 711 during the induction welding process, and with the polymer support piece 717 provides support to the thermoplastic component 312 during the induction welding process. In other words, the polymer support piece 717 and the non-conductive support piece 711 are provided between the second portion of the thermoplastic component 312b and the bladder 713. In some implementations, the bladder 713 is a fire hose bladder. However, various implementations are possible and the bladder 713 can be any type of bladder sufficient to provide support to the non-conductive support piece 711, the polymer support piece 717, and the thermoplastic component 312 during the induction welding process.

The non-conductive support pieces 705 and 707 are provided such that a space is present between the non-conductive support pieces 705 and 707. In some implementations, the space between the non-conductive support pieces 705 and 707 defines a longitudinal welding slot 715 configured to receive a welding probe, such as the induction welding probe 114. In some implementations, the longitudinal welding slot 715 is the longitudinal welding slot 310. The longitudinal heat sink 701, ceramic holder 703, polymer support piece 717, non-conductive support piece 711, and the bladder 713 are provided longitudinally with the longitudinal welding slot 715 and the junction of the first portion of the thermoplastic component 312a and the second portion of the thermoplastic component 312b such that the induction welding probe 114 performs induction welding of the first portion of the thermoplastic component 312a and the second portion of the thermoplastic component 312b through the longitudinal welding slot 715.

In some implementations, the longitudinal welding slot 715 is provided in the same location on the upper portion 304 as the one or more welding slots 308a, 308b, 308n. In this implementation, the induction welding probe 114 is configured to perform induction welding of the thermoplastic component 312 to the thermoplastic support component 314 through the welding slot 308n and induction welding of the first portion of the thermoplastic component 312a and the second portion of the thermoplastic component 312b through the longitudinal welding slot 715 at the location of the welding slot 308n.

Figure 8:
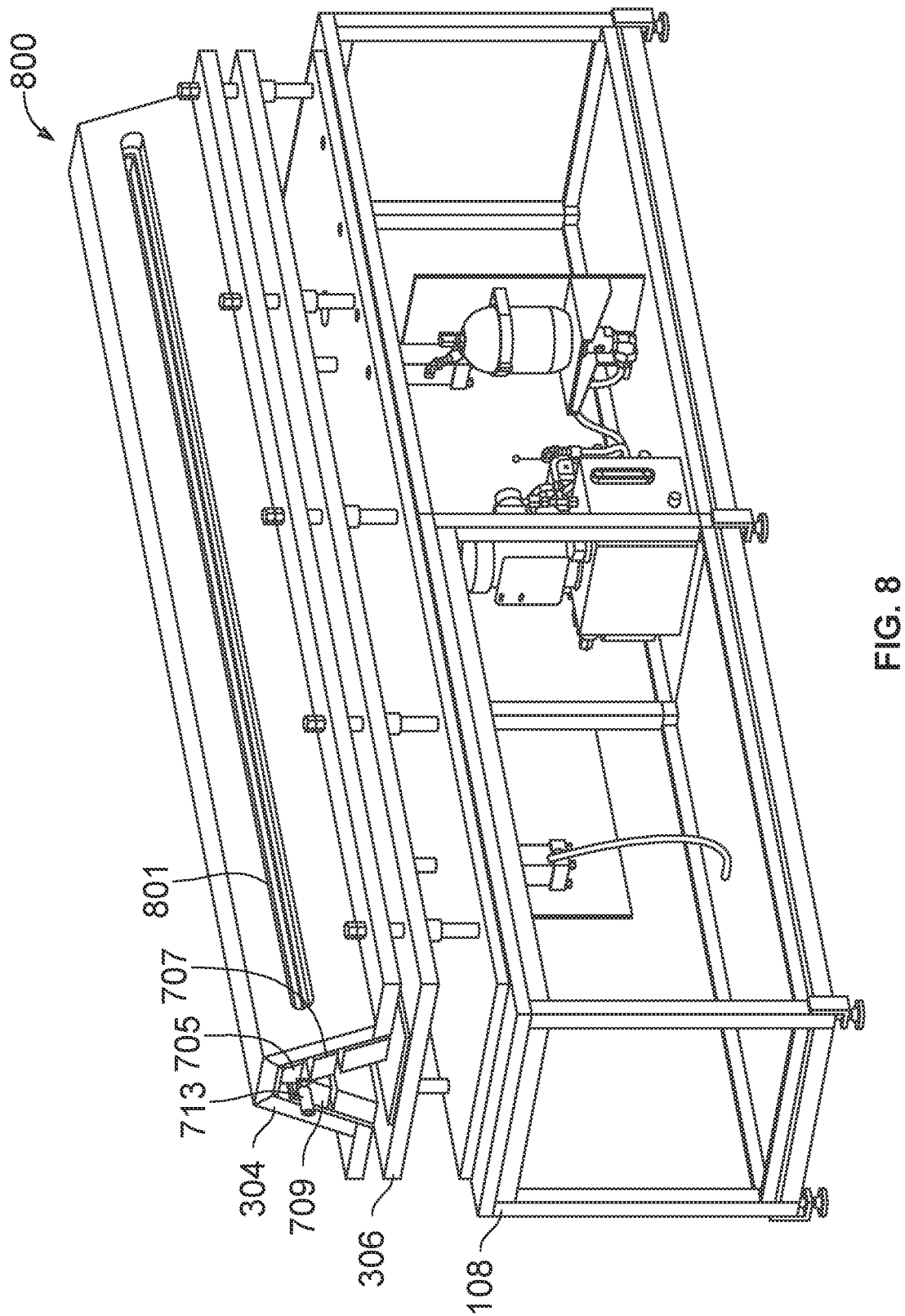
FIG. 8 illustrates a perspective view of an implementation of the thermoplastic welding assembly according to various implementations of the present disclosure.
Figure 9A:
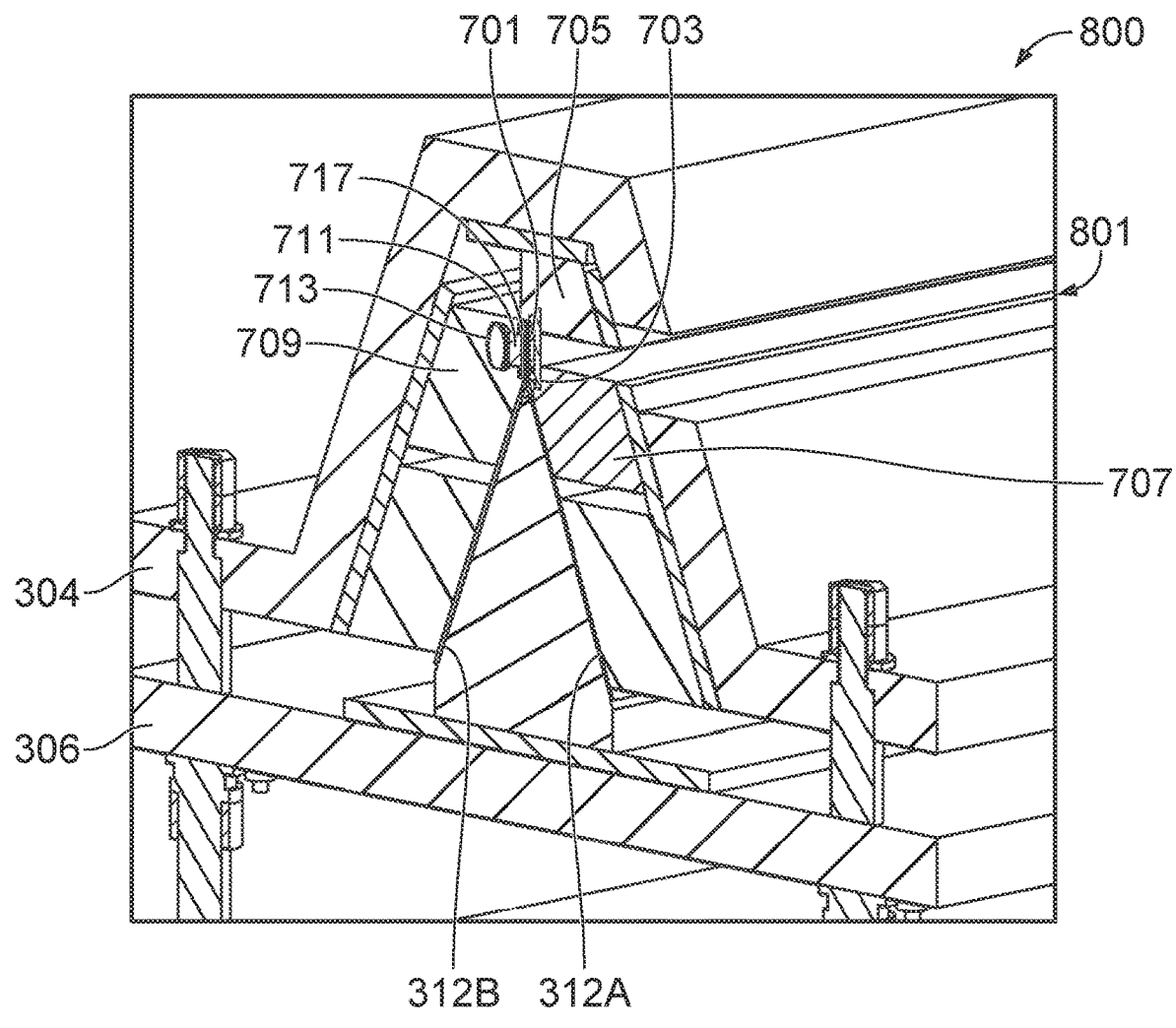
FIG. 9A illustrates a cutaway, perspective view of an implementation of the thermoplastic welding assembly according to various implementations of the present disclosure.
Figure 9B:
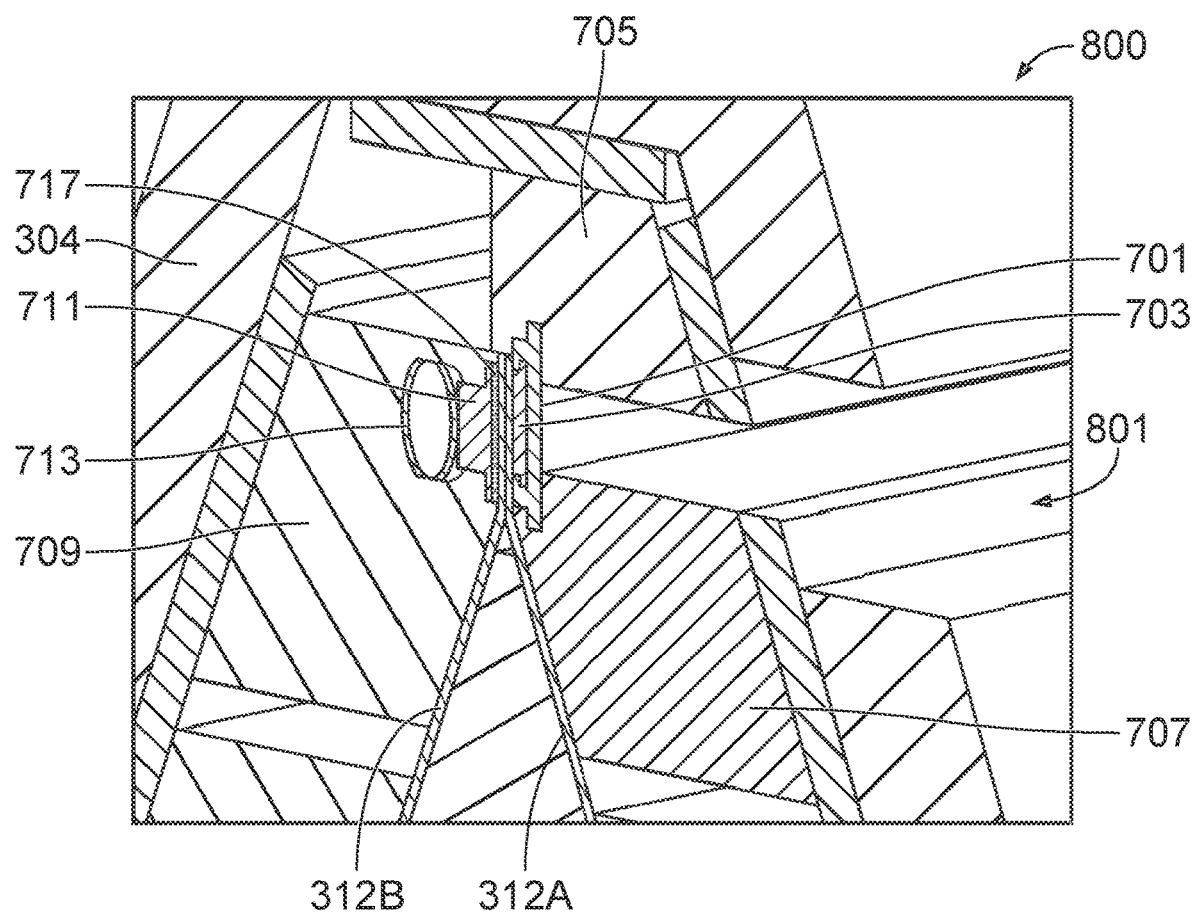
FIG. 9B illustrates a magnified cutaway, perspective view of an implementation of the thermoplastic welding assembly according to various implementations of the present disclosure.

FIG. 8 illustrates a perspective view of an implementation of the thermoplastic welding assembly according to various implementations of the present disclosure. FIG. 9A illustrates a cutaway, perspective view of an implementation of the thermoplastic welding assembly and FIG. 9B illustrates a magnified cutaway, perspective view of an implementation of the thermoplastic welding assembly according to various implementations of the present disclosure according to various implementations of the present disclosure. The example of the implementation of the thermoplastic welding assembly is for illustration only. Other implementations may be used without departing from the scope of the present disclosure.

In some implementations, as shown in FIG. 8, the thermoplastic welding assembly 800 is placed on the outer structural shell 108 and includes a longitudinal welding slot 801. In some implementations, the longitudinal welding slot 801 is the longitudinal welding slot 310 and/or the longitudinal welding slot 715. In some implementations, the longitudinal welding slot 801 is provided in a substantially horizontal direction and accordingly can be referred to herein as a horizontal welding slot. The longitudinal welding slot 801 is configured to receive the induction welding probe 114 for joining a first portion of the thermoplastic component 312a to a second portion of the thermoplastic component 312b. In some implementations, the longitudinal welding slot 801 corresponds to the longitudinal welding slot 715 defined by the space between the non-conductive support pieces 705 and 707.

In some implementations, as illustrated in FIG. 8, the longitudinal welding slot 801 is provided as the only welding slot on the upper portion 304 of the frame 302. In other words, the longitudinal welding slot 801 is provided while the welding slots 308a, 308b, 308n are not provided. In another implementation, as shown in FIG. 3C, one or more of the welding slots 308a, 308b, 308n are provided on the upper portion 304 while the longitudinal welding slot 801 is not provided as a separate welding slot on the upper portion 304, but is provided as overlapping with the one or more welding slots 308a, 308b, 308n. In another implementation, each of the one or more welding slots 308a, 308b, 308n and the longitudinal welding slot 801 are each separately provided on the upper portion 304. In other words, the one or more welding slots 308a, 308b, 308n are provided in a substantially vertical direction and the longitudinal welding slot 801 is provided in a substantially horizontal direction.

The implementation of the thermoplastic welding assembly 800 further includes the non-conductive support pieces 705, 707, 709 and the bladder 713. As illustrated in FIGS. 9A and 9B, the thermoplastic welding assembly 800 further includes the longitudinal heat sink 701, the ceramic holder 703, the non-conductive support piece 711, and the polymer support piece 717. The ceramic holder 703 is placed proximate to the longitudinal welding slot 801 such that the induction welding probe 114 can be inserted through the longitudinal welding slot 801 and perform induction welding on the first portion of the thermoplastic component 312a and the second portion of the thermoplastic component 312b.

Figure 10:
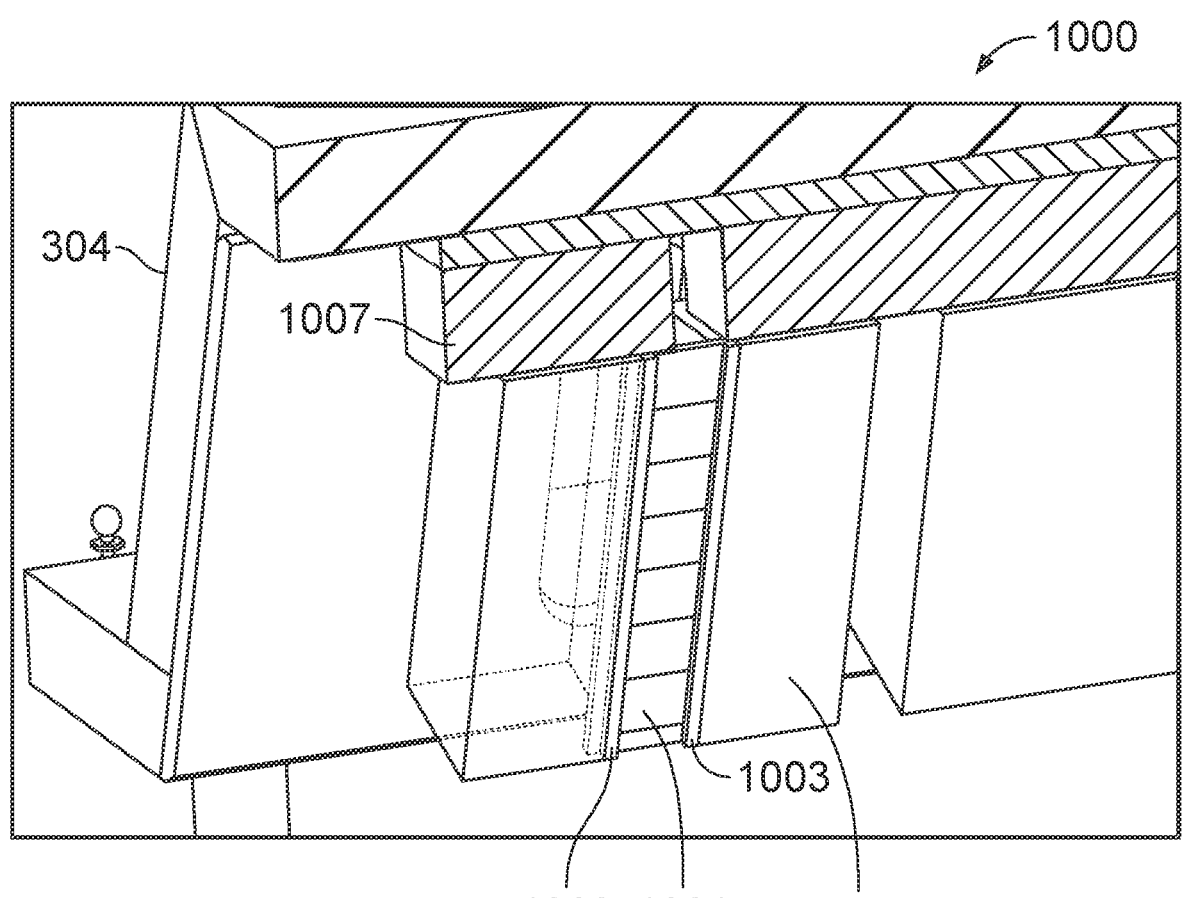
FIG. 10 illustrates a cutaway view of an interior of the thermoplastic welding assembly according to various implementations of the present disclosure.

FIG. 10 illustrates a cutaway view of an interior of the thermoplastic welding assembly according to various implementations of the present disclosure. The example of the implementation of the thermoplastic welding assembly is for illustration only. Other implementations may be used without departing from the scope of the present disclosure.

FIG. 10 illustrates a support portion placed on the interior of the upper portion 304. The thermoplastic welding assembly 1000 illustrated in FIG. 10 can be one or more of the thermoplastic welding assembly 106, the thermoplastic welding assembly 300, the thermoplastic welding assembly 500, the thermoplastic welding assembly 600, the thermoplastic welding assembly 700, and/or the thermoplastic welding assembly 800. The thermoplastic welding assembly 1000 includes a ceramic insert 1001. The ceramic insert 1001 can be a heat sink, such as the heat sink 411 and/or the longitudinal heat sink 701. The ceramic insert 1001 is supported by a ceramic insert carrier 1003, such as the ceramic holder 703. In some implementations, the ceramic insert 1001 is surrounded on three sides by the ceramic insert carrier 1003 to provide structural support to the ceramic insert 1001. In implementations where the frame 302 is closed, the ceramic insert 1001 is held in place by the ceramic insert carrier 1003 on three sides and the thermoplastic component 312 on a fourth side.

In some implementations, the thermoplastic welding assembly 1000 further includes support pieces such as the support piece 1005 and the support piece 1007. The support pieces 1005, 1007 are provided on the interior of the upper portion 304 and prevent unnecessary movement of the ceramic insert 1001 and the ceramic insert carrier 1003. In various implementations, the support pieces 1005, 1007 are comprised of a polyurethane board, a polyurethan foam, a thermoset resin/wood fiber reinforced laminate material, or any other suitable material.

Figure 11:
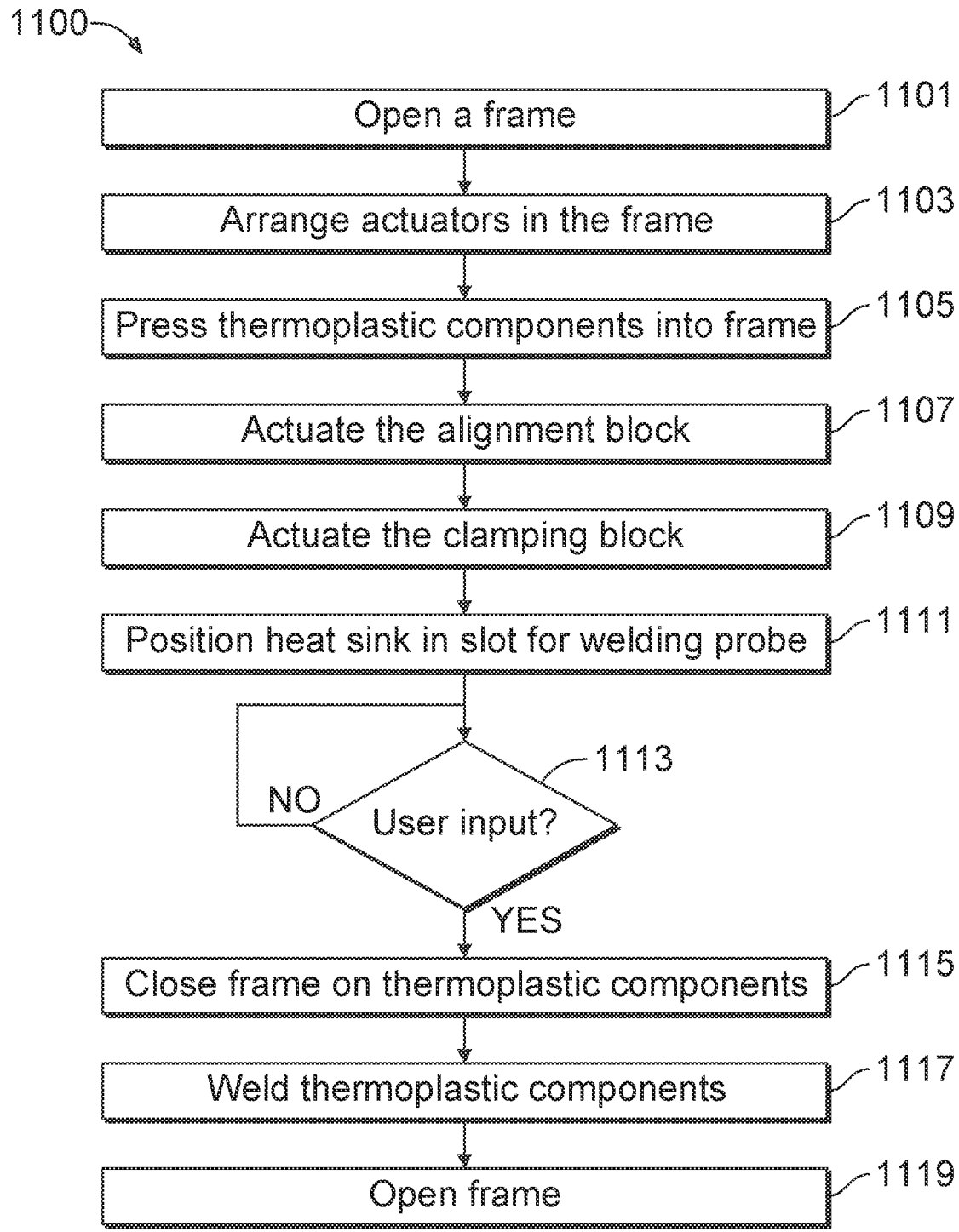
FIG. 11 illustrates a flowchart diagram illustrating a workflow for welding thermoplastic components welding thermoplastic according to various implementations of the present disclosure.

FIG. 11 illustrates a flowchart diagram illustrating an operational workflow method for welding thermoplastic components welding thermoplastic according to various implementations of the present disclosure. The method 1100 can be executed by one or more components described herein, such as the thermoplastic welding assembly 106, 300.

The method 1100 may be implemented by the thermoplastic welding assembly 300 equipped with the previously discussed frame 302 that includes the upper portion 304 with the welding slots 308a, 308b, 308n for the induction welding probe 114 and the lower portion 306. Various implementations of the method 1100 may be performed without departing from the scope of the present disclosure.

Initially, the frame 302 is opened by separating the upper portion 304 and the lower portion 306 in step 1101. In step 1103, the actuators, such as the alignment actuator 401 and the clamping actuator 403, are arranged in the frame 302. In step 1105, thermoplastic components, such as the thermoplastic component 312 and the thermoplastic support component 314, are pressed into the frame 302.

In step 1107, the alignment actuator, or block, 401 is actuated to move the thermoplastic support component 314 into alignment with at least one welding slot 308. In step 1109, the clamping actuator, or block, 403 is actuated to clamp the thermoplastic component 312 against the form block 405. In step 1111, one or more heat sinks 411 is placed in the at least one welding slot 308. The induction welding probe 114 is then placed proximate to the one or more heat sinks 411 placed in the at least one welding slot 308.

In step 1113, it is determined whether a user input is received. For example, the thermoplastic welding assembly 300 receives a user input to initiate the induction welding. In implementations where the user input is not received, the method 1100 returns to step 1113 and again determines whether the user input is received. In implementations where the user input is received, in step 1115 the frame 302 is closed on the thermoplastic components 312 and thermoplastic support components 314. In step 1117, the welding is initiated and performed by the welding tool 102, for example the induction welding probe 114. In some implementations, multiple thermoplastic support components 314 are induction welded to the thermoplastic component 312 simultaneously. In step 1119, following completion of the induction welding process, the frame 302 is opened and the welded thermoplastic components are removed.

Although described herein as a series of steps, additional steps can be performed, steps can be removed, or steps can be performed in a different order without departing from the scope of the present disclosure. The order of execution or performance of the operations in implementations of the disclosure illustrated and described herein is not essential, and may be performed in different sequential manners in various implementations. For example, it is contemplated that executing or performing a particular operation before, contemporaneously with, or after another operation is within the scope of aspects of the disclosure. In one particular implementation, the alignment actuator 401 and the clamping actuator 403 are arranged in the frame 302 prior to the opening of the frame 302 in step 1101. In this implementation, step 1103 can be omitted and the method 1100 proceeds to pressing the thermoplastic components into the frame 302 in step 1105.

Figure 12:
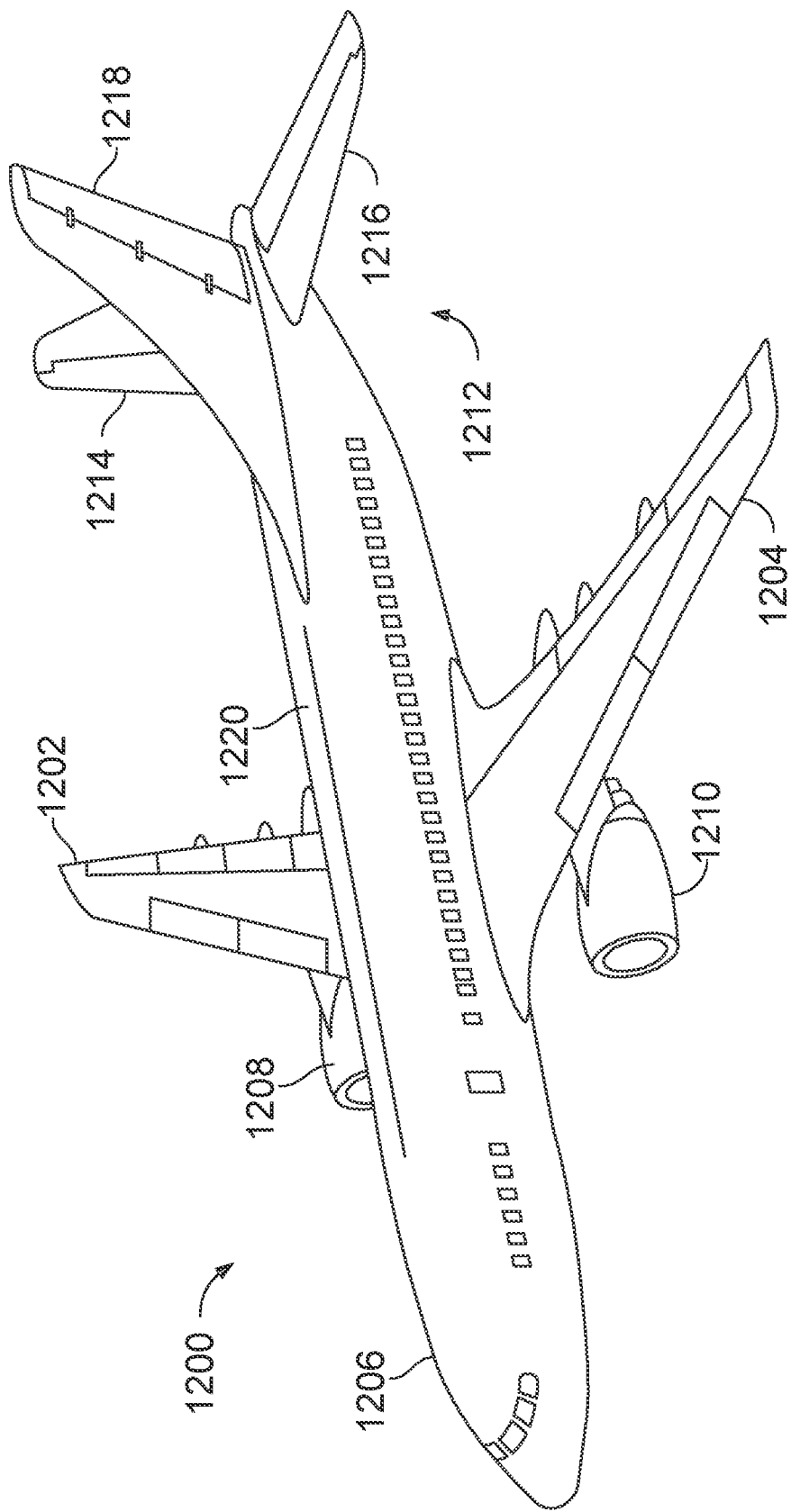
FIG. 12 illustrates a schematic perspective view of an aircraft having one or more portions assembled by the thermoplastic welding systems and methods according to various implementations of the present disclosure.

FIG. 12 illustrates a schematic perspective view of an aircraft having one or more portions assembled by the thermoplastic welding systems and methods according to various implementations of the present disclosure. One or more implementations allow for fabrication of thermoplastic aircraft parts for an aircraft 1200 as illustrated in FIG. 12. The aircraft 1200 includes a wing 1202 and a wing 1204 attached to a body 1206. The aircraft 1200 also includes an engine 1208 attached to the wing 1202 and an engine 1210 attached to the wing 1204. The body 1206 has a tail section 1212 with a horizontal stabilizer 1214, a horizontal stabilizer 1216, and a vertical stabilizer 1218 attached to the tail section 1212 of the body 1206. The body 1206 in some implementations has a composite skin 1220.

The aircraft 1200 is an example of an aircraft in which welded thermoplastic structures can be implemented in accordance with various implementations described herein. In one particular implementation as described in more detail herein, a composite bracket and blade stringer of the aircraft 1200 is a welded thermoplastic structure formed according to the present disclosure. In other implementations, a structural support such as a spar, rib, or other structural support of the wing 1202, the wing 1204, or the body 1206 welded to another component comprises a thermoplastic structure. For example, a structural support of the body 1206 welded to the composite skin 1220 can comprise a welded thermoplastic structure.

In some implementations, the present disclosure allows induction welding of different geometries or configurations of parts with magnetic flux from the induction coil 224 applied to only one side of the thermoplastic components to be welded. For example, the induction coil 224 allows for induction welding from one side while effectively spreading heat and pressure as described herein. For example, some or all aspects of the present disclosure can be implemented at least on the wing 1204, the body 1206, and/or the composite skin 1220 described herein.

The illustration of the aircraft 1200 is not meant to imply physical or architectural limitations to the manner in which an illustrative configuration may be implemented. For example, although the aircraft 1200 is a commercial aircraft, the aircraft 1200 can be a military aircraft, a rotorcraft, a helicopter, an unmanned aerial vehicle, or any other suitable aircraft. Other vehicles are possible as well, such as, for example but without limitation, an automobile, a motorcycle, a bus, a boat, a train, or the like.

Thus, various implementations facilitate induction welding of parts by improving the heating of (e.g., more uniformly heat) the weld interface between the parts from a single side of the parts. The present disclosure, including the implementations described herein, can be implemented using different manufacturing environments. For example, some or all aspects of the present disclosure can be implemented at least in the material procurement and component and assembly manufacturing, as described herein.

Although described herein as a thermoplastic welding assembly including a plurality of welding slot, a plurality of heat sinks, a plurality of individually actuatable pressurizers, a plurality of induction welding probes, and a longitudinal welding slot, it should be understood that these examples are provided for illustration only and should not be construed as limiting. Various implementations are possible and contemplated by the present disclosure. For example, some implementations can include one or more of a single welding slot, a single heat sink, a single actuatable pressurizer assembly, a single induction welding probe, a plurality of longitudinal welding slots, and so forth.

The following clauses describe further aspects of the present disclosure. In some implementations, the clauses described below can be further combined in any subcombination without departing from the scope of the present disclosure.

Clause Set A:

A1: A thermoplastic welding assembly for joining a plurality of thermoplastic support components to a thermoplastic component, comprising:

a frame having a plurality of welding slots;

a plurality of heat sinks, each heat sink positioned within one of the welding slots; and a plurality of individually actuatable pressurizers, each pressurizer comprising:

an alignment actuator configured to move one thermoplastic support component into alignment with one welding slot, and a clamping actuator configured to move the one thermoplastic support component into contact with the thermoplastic component.

A2: The thermoplastic welding assembly of A1, further comprising a form block against which the clamping actuator presses the one thermoplastic support component and the thermoplastic component together.

A3. The thermoplastic welding assembly of A2, wherein the form block further comprises a tool locator, wherein the alignment actuator is configured to position the one thermoplastic support component against the tool locator.

A4. The thermoplastic welding assembly of any of A1 to A3, wherein the frame further comprises a longitudinal welding slot configured to receive a welding probe for joining a first portion of the thermoplastic component to a second portion of the thermoplastic component.

A5. The thermoplastic welding assembly of A4, further comprising a longitudinal heat sink positioned within the longitudinal welding slot to dissipate heat during welding of the first portion of the thermoplastic component to the second portion of the thermoplastic component.

A6. The thermoplastic welding assembly of A5, wherein the heat sink has a width wider than the welding probe.

A7. The thermoplastic welding assembly of any one of A1 to A6, wherein the frame comprises:

an upper portion having the plurality of welding slots, and a lower portion supporting the alignment actuator and the clamping actuator.

A8. The thermoplastic welding assembly of A7, further comprising:

a bench actuator configured to close and open the frame by moving the upper portion and the lower portion toward and away from each other, respectively.

A9. The thermoplastic welding assembly of A8, wherein the bench actuator is a hydraulic actuator.

A10: The thermoplastic welding assembly of any one of A1 to A9, wherein the clamping actuator is a pneumatic actuator.

A11: The thermoplastic welding assembly of any one of A1 to A10, wherein the one thermoplastic support component is a rib.

A12: The thermoplastic welding assembly of any one of A1 to A11, wherein the thermoplastic component is a skin.

A13: The thermoplastic welding assembly of any one of A1 to A12, further comprising a plurality of welding probes for welding the plurality of thermoplastic support components to the thermoplastic component through the welding slots.

A14: The thermoplastic welding assembly of A13, wherein each of the plurality of welding probes is an induction welding probe.

Clause Set B:

B1: A thermoplastic welding assembly for joining a plurality of thermoplastic support components to a thermoplastic component, comprising:

a frame having a plurality of welding slots;

a plurality of individually actuatable pressurizers, each pressurizer comprising:

an alignment block movable in a first direction to move one thermoplastic support component into alignment with one welding slot, and a clamping block movable in a second direction to move the one thermoplastic support component into contact with the thermoplastic component, wherein the first direction is a different direction than the second direction; and a plurality of actuators configured to move the alignment block and the clamping block.

B2: The thermoplastic welding assembly of B1, wherein the first direction and the second direction differ by between 70-110 degrees from each other.

B3: The thermoplastic welding assembly of any one of B1 to B2, further comprising a plurality of heat sinks, each heat sink positioned within one of the welding slots.

B4: The thermoplastic welding assembly of any one of B1 to B3, further comprising a plurality of welding probes configured to be positioned within the plurality of welding slots to weld the thermoplastic support components to the thermoplastic component at the same time.

B5: The thermoplastic welding assembly of any one of B1 to B4, wherein the clamping block and the alignment block are made of non-conductive material.

Clause set C:

C1: A method for joining a plurality of thermoplastic support components to a thermoplastic component, comprising:

opening a frame to allow for the thermoplastic component and the plurality of thermoplastic support components to be positioned on a clamping block, the frame comprising at least one welding slot;

actuating an alignment block to move at least one support component into alignment with the at least one welding slot;

actuating a clamping block to clamp the thermoplastic component against a form block; and welding the at least one support component to the thermoplastic component through the at least one welding slot.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this disclosure to mean including the feature(s) or act(s) followed thereafter, without excluding the presence of one or more additional features or acts.

In some implementations, the operations illustrated in the figures may be implemented as software instructions encoded on a computer readable medium, in hardware programmed or designed to perform the operations, or both. For example, aspects of the disclosure may be implemented as an ASIC, SoC, or other circuitry including a plurality of interconnected, electrically conductive elements.

The order of execution or performance of the operations in implementations of the disclosure illustrated and described herein is not essential, unless otherwise specified. That is, the operations may be performed in any order, unless otherwise specified, and implementations of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

Although the present disclosure has been described with reference to various implementations, various changes and modifications can be made without departing from the scope of the present disclosure.

What is claimed is:

1. A thermoplastic welding assembly for joining a plurality of thermoplastic support components to a thermoplastic component, comprising:
    a frame having a plurality of welding slots;
    a plurality of heat sinks, each heat sink positioned within one of the welding slots;
    a plurality of individually actuatable pressurizers, each pressurizer comprising:

an alignment actuator configured to move one thermoplastic support component of the plurality of thermoplastic support components into alignment with one welding slot, and a clamping actuator configured to move the one thermoplastic support component into contact with the thermoplastic component; and at least one welding probe for welding the plurality of thermoplastic support components to the thermoplastic component through the welding slots.

2. The thermoplastic welding assembly of claim 1, further comprising a form block against which the clamping actuator presses the one thermoplastic support component and the thermoplastic component together.

3. The thermoplastic welding assembly of claim 2, wherein the form block further comprises a tool locator, wherein the alignment actuator is configured to position the one thermoplastic support component against the tool locator.

4. The thermoplastic welding assembly of claim 1, wherein the frame further comprises a longitudinal welding slot configured to receive the at least one welding probe for joining a first portion of the thermoplastic component to a second portion of the thermoplastic component.

5. The thermoplastic welding assembly of claim 4, further comprising a longitudinal heat sink positioned within the longitudinal welding slot to dissipate heat during welding of the first portion of the thermoplastic component to the second portion of the thermoplastic component.

6. The thermoplastic welding assembly of claim 5, wherein the longitudinal heat sink has a width wider than the at least one welding probe.

7. The thermoplastic welding assembly of claim 1, wherein the frame comprises:
an upper portion having the plurality of welding slots, and
a lower portion supporting the alignment actuator and the clamping actuator.

8. The thermoplastic welding assembly of claim 7, further comprising:
a bench actuator configured to close and open the frame by moving the upper portion and the lower portion toward and away from each other, respectively.

9. The thermoplastic welding assembly of claim 8, wherein the bench actuator is a hydraulic actuator.

10. The thermoplastic welding assembly of claim 1, wherein the clamping actuator is a pneumatic actuator.

11. The thermoplastic welding assembly of claim 1, wherein the one thermoplastic support component is a rib.

12. The thermoplastic welding assembly of claim 1, wherein the thermoplastic component is a skin.

13. The thermoplastic welding assembly of claim 1, wherein the at least one welding probe is a plurality of welding probes for welding the plurality of thermoplastic support components to the thermoplastic component through the welding slots.

14. The thermoplastic welding assembly of claim 13, wherein each of the plurality of welding probes is an induction welding probe.

15. A thermoplastic welding assembly for joining a plurality of thermoplastic support components to a thermoplastic component, comprising:
a frame having a plurality of welding slots;
a plurality of heat sinks, each heat sink positioned within one of the welding slots;
a plurality of individually actuatable pressurizers, each pressurizer comprising:
an alignment block movable in a first direction to move one thermoplastic support component of the plurality of thermoplastic support components into alignment with one welding slot, and
a clamping block movable in a second direction to move the one thermoplastic support component into contact with the thermoplastic component, wherein the first direction is a different direction than the second direction;
a plurality of actuators configured to move the alignment block and the clamping block; and
at least one welding probe for welding the plurality of thermoplastic support components to the thermoplastic component through the welding slots.

16. The thermoplastic welding assembly of claim 15, wherein the first direction and the second direction differ by between 70-110 degrees from each other.

17. The thermoplastic welding assembly of claim 15, wherein the one thermoplastic support component is a rib.

18. The thermoplastic welding assembly of claim 15, wherein the at least one welding probe is a plurality of welding probes configured to be positioned within the plurality of welding slots to weld the plurality of thermoplastic support components to the thermoplastic component at the same time.

19. The thermoplastic welding assembly of claim 15, wherein the clamping block and the alignment block are made of non-conductive material.

20. The thermoplastic welding assembly of claim 15, wherein the frame further comprises a longitudinal welding slot configured to receive the at least one welding probe for joining a first portion of the thermoplastic component to a second portion of the thermoplastic component.

* * * * *